(12) United States Patent
Takemoto

(10) Patent No.: US 8,873,154 B2
(45) Date of Patent: Oct. 28, 2014

(54) TELE-SIDE CONVERTER LENS AND IMAGE PICKUP APPARATUS INCLUDING THE SAME

(71) Applicant: Canon Kabushiki Kaisha, Tokyo (JP)

(72) Inventor: Shoichi Takemoto, Utsunomiya (JP)

(73) Assignee: Canon Kabushiki Kaisha (JP)

(*) Notice: Subject to any disclaimer, the term of this patent is extended or adjusted under 35 U.S.C. 154(b) by 78 days.

(21) Appl. No.: 13/761,296

(22) Filed: Feb. 7, 2013

(65) Prior Publication Data

US 2013/0208173 A1 Aug. 15, 2013

(30) Foreign Application Priority Data

Feb. 9, 2012 (JP) .................................. 2012-026210

(51) Int. Cl.
| G02B 15/12 | (2006.01) |
| G02B 15/10 | (2006.01) |
| G02B 15/14 | (2006.01) |
| G02B 15/02 | (2006.01) |
| G02B 13/02 | (2006.01) |

(52) U.S. Cl.
CPC .............. *G02B 13/02* (2013.01); *G02B 15/10* (2013.01); *G02B 15/02* (2013.01); *G02B 15/14* (2013.01); *G02B 15/12* (2013.01)
USPC ............ 359/673; 359/672; 359/692; 359/793

(58) Field of Classification Search
CPC ........ G02B 15/02; G02B 15/04; G02B 15/06; G02B 15/10; G02B 15/12; G02B 15/14
USPC .......................... 359/672, 673, 692, 793, 795
See application file for complete search history.

(56) References Cited

U.S. PATENT DOCUMENTS

| 6,424,465 B2* | 7/2002 | Suzuki .......................... 359/557 |
| 6,563,644 B2* | 5/2003 | Suzuki .......................... 359/557 |
| 7,136,226 B2* | 11/2006 | Suzuki .......................... 359/569 |
| 7,170,689 B2* | 1/2007 | Miyazawa .................... 359/672 |
| 2011/0292518 A1* | 12/2011 | Kim ............................. 359/673 |

FOREIGN PATENT DOCUMENTS

| JP | 55-032046 A | 3/1980 |
| JP | 2003-307675 A | 10/2003 |
| JP | 2005-331851 A | 12/2005 |

* cited by examiner

*Primary Examiner* — Thomas K Pham
*Assistant Examiner* — Nicholas Pasko
(74) *Attorney, Agent, or Firm* — Rossi, Kimms & McDowell LLP

(57) ABSTRACT

A tele-side converter lens including a first unit having a positive refractive power and a second unit having a negative refractive power, in which: the first unit includes one or two positive lenses; the second unit includes one negative lens and one or two positive lenses; and average Abbe constant and partial dispersion ratio of materials of positive lenses constituting the first unit, average Abbe constant and partial dispersion ratio of materials of positive lenses constituting the second unit, an Abbe constant and a partial dispersion ratio of materials of the negative lenses constituting the second unit, combined Abbe constants of materials of the lenses constituting the respective first and second units, focal lengths of the first and second units, a refractive index of a material of a positive lens disposed closest to the object side, and a magnification of the tele-side converter lens are appropriately set, respectively.

9 Claims, 18 Drawing Sheets

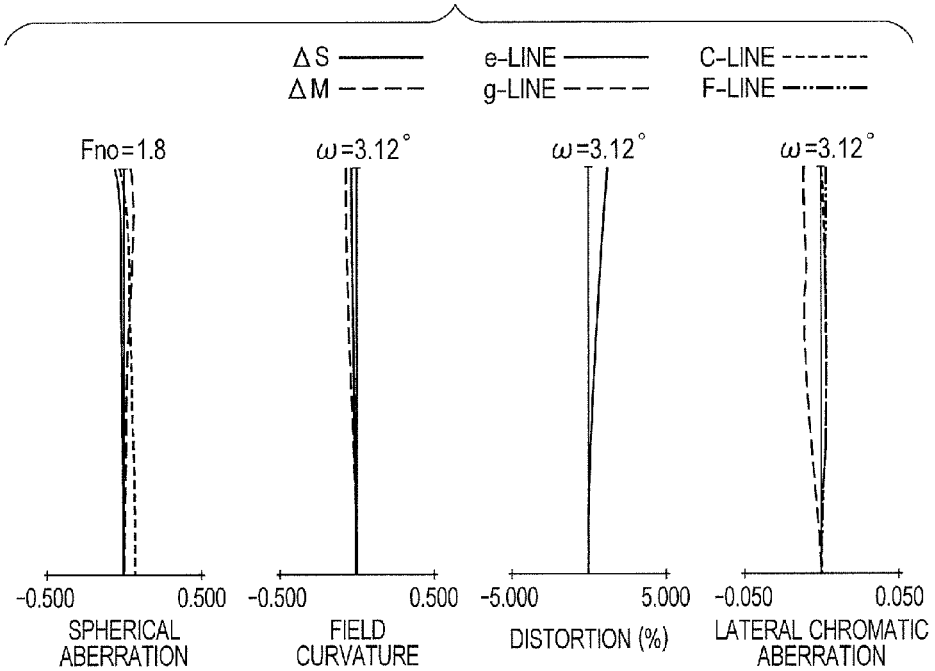
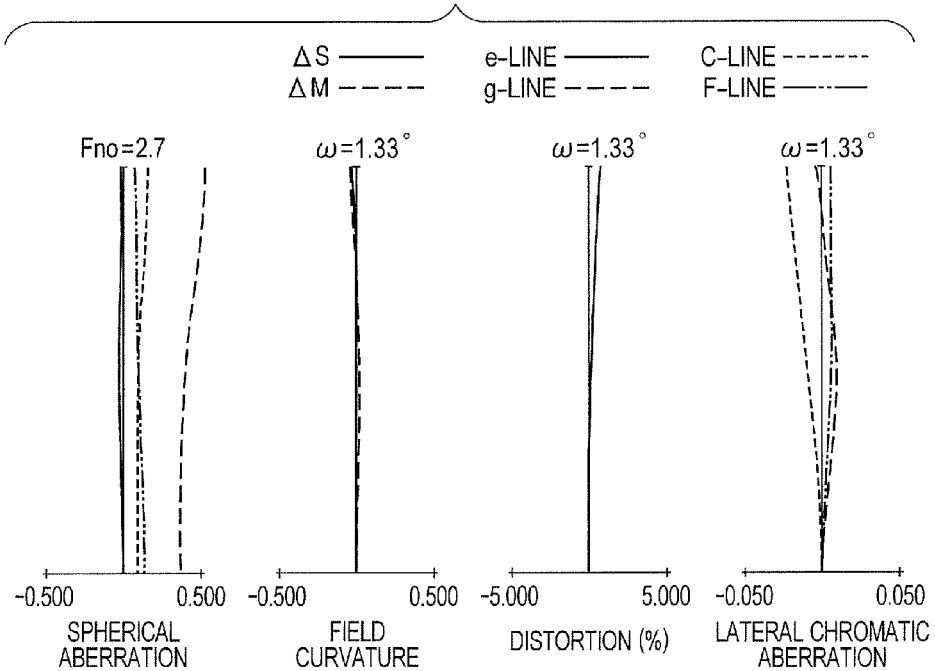

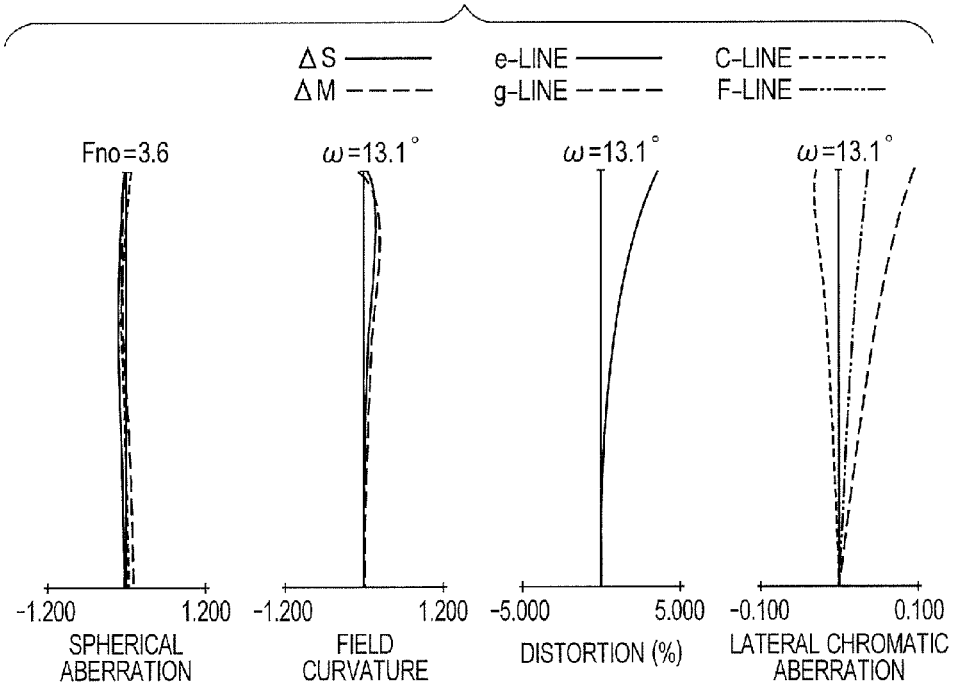
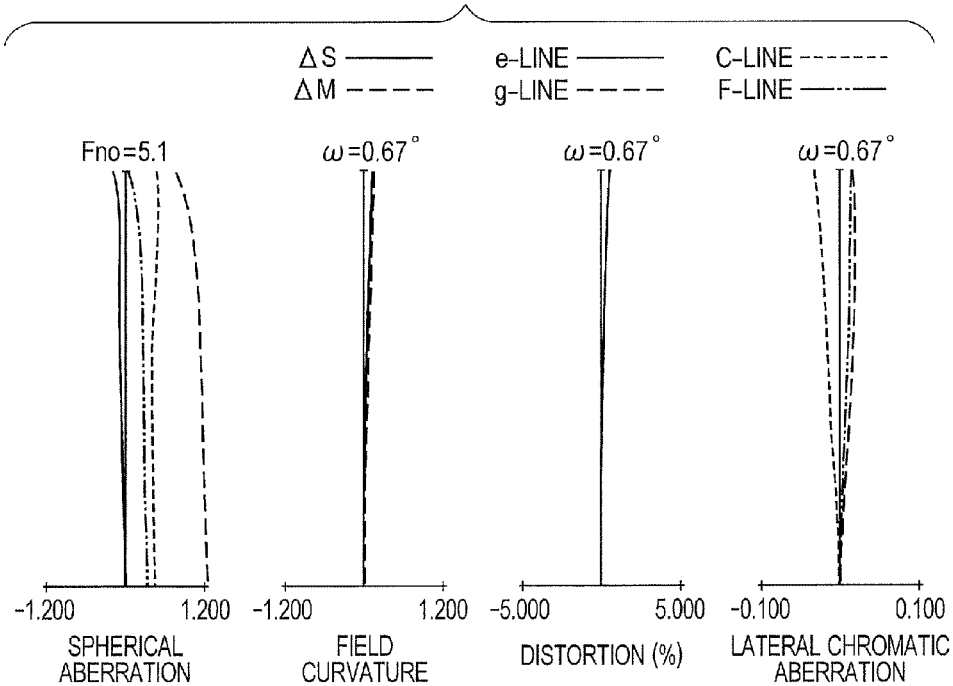

TELE-SIDE CONVERTER LENS AND IMAGE PICKUP APPARATUS INCLUDING THE SAME

BACKGROUND OF THE INVENTION

1. Field of the Invention

The present invention relates to a tele-side converter lens which is removably mounted to an object side of a photographing lens (master lens), which is used for a digital still camera, a video camera, a broadcast camera, and the like, so as to change a focal length of an entire system to be longer than an original focal length of the master lens.

2. Description of the Related Art

In general, as a method of changing (increasing) a focal length of the master lens (photographing lens) to a telephoto side, there is known a front teleconverter lens in which an afocal lens is removably mounted to the object side of the master lens. This method has an advantage that the focal length is changed without sacrificing (without changing) an F-number of the master lens at a telephoto end. The tele-side converter lens is one type of the teleconverter lenses, which is downsized on the precondition of being used mainly only on the telephoto side having a small angle of field.

In recent years, along with downsizing of a digital camera and a video camera and increase in number of pixels of a solid-state image pickup element such as a CCD sensor, a photographing lens used for such cameras has been required to be small in size and to have high optical performance in which a chromatic aberration is appropriately corrected. Therefore, the tele-side converter lens mounted to the photographing lens is also required to be small in size and to have high optical performance in the same manner. As this front teleconverter lens, there is known a lens including, in order from the object side to an image side, a front lens unit having a positive refractive power and a rear lens unit having a negative refractive power.

As one of such lenses, there is known a teleconverter lens formed of three lenses in which the front lens unit is formed of a single positive lens and the rear lens unit is formed of a negative lens and a positive lens (Japanese Patent Application Laid-Open No. 2003-307675). In addition, there is known a teleconverter lens formed of four lenses in which the front lens unit is formed of two positive lenses and the rear lens unit is formed of a positive lens and a negative lens (Japanese Patent Application Laid-Open No. 2005-331851). In addition, there is known a small teleconverter lens, in which each of the front lens unit and the rear lens unit is formed of a single lens (Japanese Patent Application Laid-Open No. S55-32046).

The teleconverter lens is required to have a short entire optical length (length from a first lens surface to a final lens surface), to be small in size as a whole, to have a small number of lenses for maintaining high optical performance when mounted to the master lens, and to have a small aberration variation. In general, when the teleconverter lens is mounted to the object side of the master lens so as to increase a focal length of the entire system, various aberrations such as a spherical aberration, an axial chromatic aberration, and a lateral chromatic aberration are significantly changed on the telephoto side.

An aberration amount in the teleconverter lens increases in proportion to a magnification of the teleconverter lens. Further, when the teleconverter lens is mounted to the master lens, various aberrations are increased in proportion to the changed focal length. In particular, when the teleconverter lens is mounted, in the frequently-used zoom position on the telephoto side, in terms of the axial chromatic aberration, not only primary deterioration of achromatism but also a secondary spectrum is increased and affects largely to image performance. Therefore, when mounting the teleconverter lens to a zoom lens having a high zoom ratio and a very long focal length at the telephoto end, such as a broadcast zoom lens, a generation amount of the axial chromatic aberration becomes a large problem.

In consideration of needs for high-definition images by a broadcast television camera supporting a high-definition television (HDTV) in recent years, it is particularly important to appropriately correct the axial chromatic aberration on the telephoto side so as to acquire high quality image performance.

For the reason described above, the teleconverter lens to be mounted to a broadcast zoom lens is strongly required, in addition to be small and light-weighted, to have the axial chromatic aberration appropriately corrected on the telephoto side when the teleconverter lens is mounted to the zoom lens. In particular, in order to satisfy optical performance required of a broadcast television camera, it is necessary that the chromatic aberration of the teleconverter lens be appropriately corrected.

In order to maintain high optical performance while downsizing the entire teleconverter lens, it is important to appropriately set a lens structure of the front lens unit having a positive refractive power and the rear lens unit having a negative refractive power. For instance, if the number of lenses constituting the entire system, the focal lengths of the front lens unit having a positive refractive power and the rear lens unit having a negative refractive power, and the materials of individual lenses constituting the individual units are not appropriately set, it is difficult to maintain good optical performance while downsizing the entire system.

SUMMARY OF THE INVENTION

The present invention provides a tele-side converter lens having a short entire optical length, small variations of various aberrations when mounted to a master lens, and high optical performance.

According to an exemplary embodiment of the present invention, there is provided a tele-side converter lens, to be removably mounted to an object side of a master lens so as to increase a focal length of an entire system, the tele-side converter lens including, in order from the object side to an image side, a first lens unit having a positive refractive power and a second lens unit having a negative refractive power, the first lens unit and the second lens unit being formed with a largest air interval therebetween, in which: the first lens unit includes one or two positive lenses; the second lens unit includes one negative lens and one or two positive lenses; and the following conditional expressions are satisfied:

$-12.50 \times 10^{-3} *(\theta gF2pa - \theta gF2n)/(\nu d2pa - \nu d2n) < -5.50 \times 10^{-3};$ $-2.05 \times 10^{-3} *(\theta gF1pa - \theta gF2n)/(\nu d1pa - \nu d2n) < -1.65 \times 10^{-3};$ $-1.05 < (f2 \times \nu d1t0)/(f1 \times \nu d2t0) < -0.95;$ $22.0 < \nu d1t0 - \nu d2n < 32.0;$ $10.0 < \nu d2n - \nu d2pa < 14.5;$ $1.55 < NdG1;$ and $1.30 < \beta < 1.60,$ where vd1*pa* and θgF1*pa* respectively represent an average Abbe constant and an average partial dispersion ratio of materials of positive lenses constituting of the first lens unit, vd2*pa* and θgF2*pa* respectively represent an average Abbe constant and an average partial dispersion ratio of materials of positive lenses constituting the second lens unit, vd2*n* and θgF2*n* respectively represent an Abbe constant and a partial dispersion ratio of materials of the negative lenses constituting the second lens unit, vd1*t0* represents a combined Abbe constant of materials of the lenses constituting the first lens unit, vd2*t0* represents a combined Abbe constant of materials of the lenses constituting the second lens unit, f1 and f2 represent focal lengths of the first lens unit and the second lens unit, respectively, NdG1 represents a refractive index of a material of a positive lens disposed closest to the object side, and β represents a magnification of the tele-side converter lens, provided that a combined Abbe constant vdi of an i-th lens unit is expressed by the following equation:

$$vdi = (1/fi) \bigg/ \sum_{k=1}^{m} \{1/(fik \times vik)\}$$

where m represents a number of lenses constituting the i-th lens unit, and fik and vik respectively represent a focal length and an Abbe constant of a k-th lens from the object side in the i-th lens unit.

According to the present invention, it is possible to obtain a tele-side converter lens having a short entire optical length, small variations of various aberrations when mounted to the master lens, and high optical performance.

Further features of the present invention will become apparent from the following description of exemplary embodiments with reference to the mounted drawings.

BRIEF DESCRIPTION OF THE DRAWINGS

FIG. 2A is an aberration diagram at an intermediate zoom position when the tele-side converter lens according to Numerical Embodiment 1 of the present invention is mounted to the master lens.

FIG. 2B is an aberration diagram at a telephoto end when the tele-side converter lens according to Numerical Embodiment 1 of the present invention is mounted to the master lens.

FIG. 10A is an aberration diagram at the intermediate zoom position when the tele-side converter lens according to Numerical Embodiment 5 of the present invention is mounted to the master lens.

FIG. 10B is an aberration diagram at the telephoto end when the tele-side converter lens according to Numerical Embodiment 5 of the present invention is mounted to the master lens.

DESCRIPTION OF THE EMBODIMENTS

Preferred embodiments of the present invention will now be described in detail in accordance with the accompanying drawings.

Description is given below of a tele-side converter lens (teleconverter lens) of the present invention, a photography system in which the tele-side converter lens is mounted to a master lens (photographing lens), and an image pickup apparatus using the photography system. Note that, the tele-side converter lens of the present invention is a lens that can be mounted to an object side of a master lens integrated with a camera main body or to an object side of an interchangeable lens that can be removably mounted to the camera main body.

The tele-side converter lens of the present invention includes, in order from the object side to the image side, a first lens unit having a positive refractive power and a second lens unit having a negative refractive power, which are with a largest air interval therebetween. The first lens unit includes one or two positive lenses, and the second lens unit includes one negative lens and one or two positive lenses.

Figure 1:
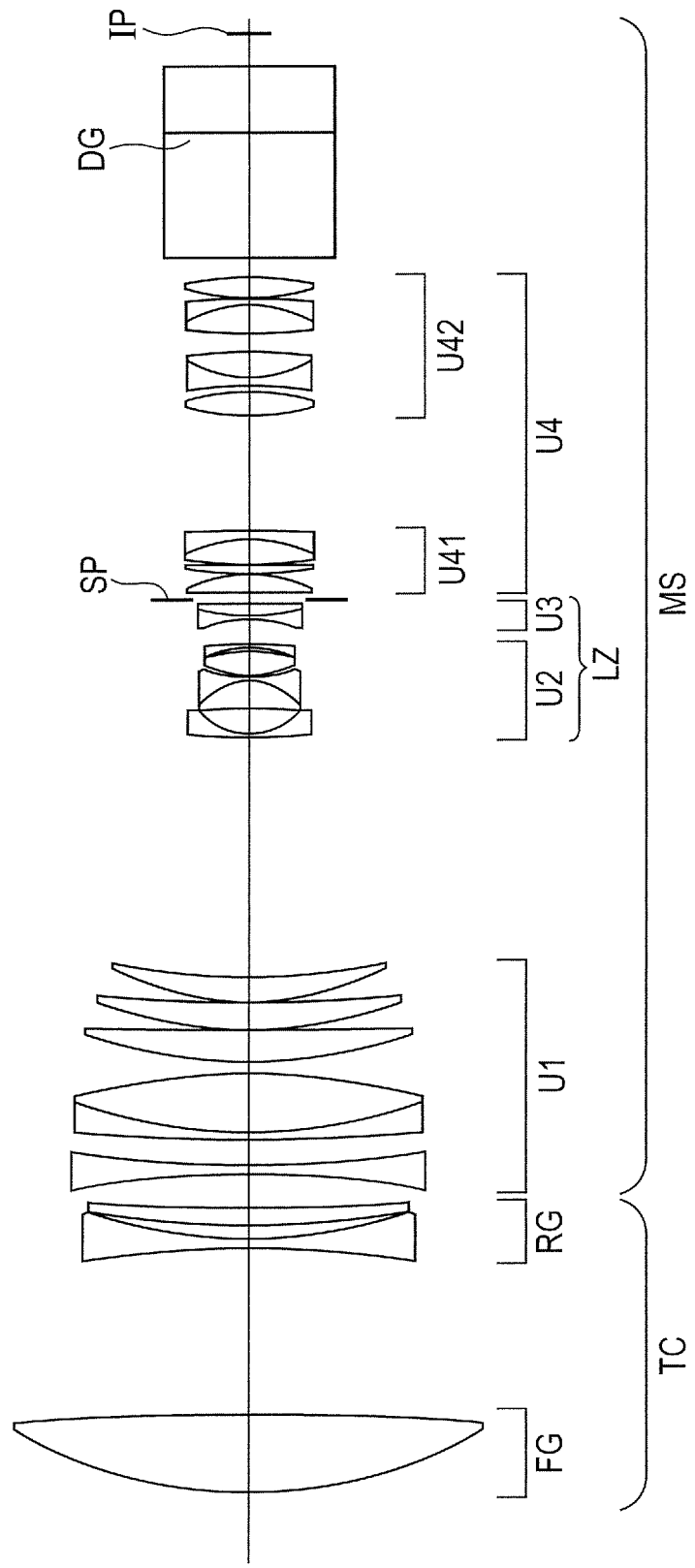
FIG. 1 is a lens cross-sectional view when a tele-side converter lens according to Numerical Embodiment 1 of the present invention is mounted to a master lens at a telephoto end.
Figure 3:
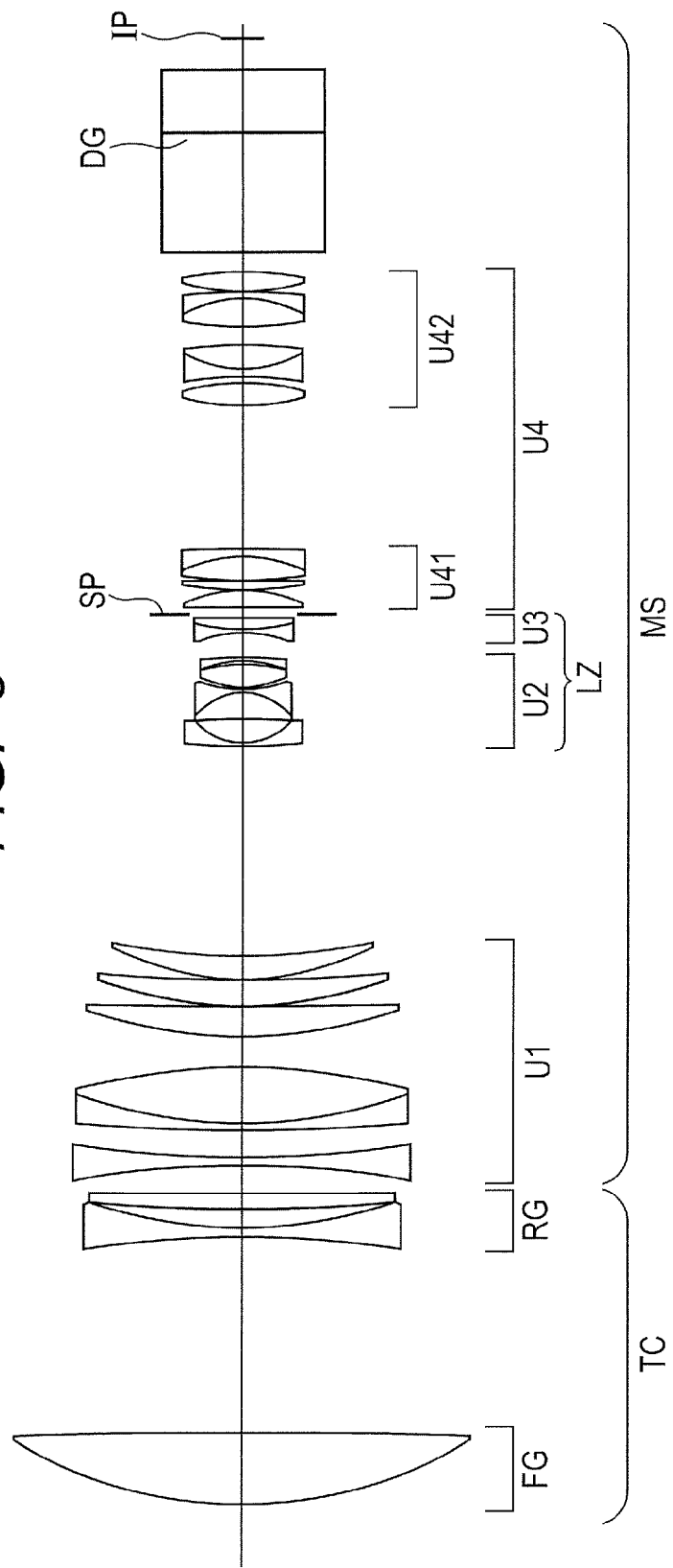
FIG. 3 is a lens cross-sectional view when a tele-side converter lens according to Numerical Embodiment 2 of the present invention is mounted to the master lens at the telephoto end.

FIG. 1 is a lens cross-sectional view at a zoom position of a telephoto end (long focal length end) when a tele-side converter lens according to Embodiment 1 of the present invention is mounted to the object side of the master lens. FIGS. 2A and 2B are aberration diagrams at an intermediate zoom position and at a zoom position of a telephoto end (long focal length end), respectively, when the tele-side converter lens according to Embodiment 1 of the present invention is mounted to the object side of the master lens. FIG. 3 is a lens cross-sectional view at the zoom position of the telephoto end when a tele-side converter lens according to Embodiment 2 of the present invention is mounted to the object side of the master lens.

Figure 4A:
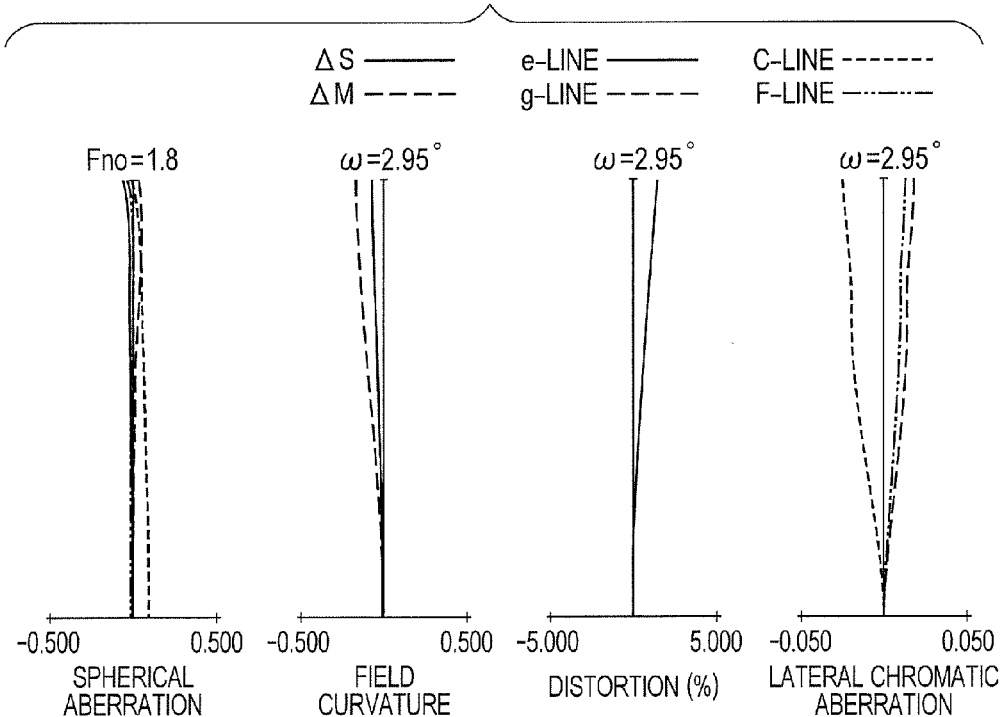
FIG. 4A is an aberration diagram at the intermediate zoom position when the tele-side converter lens according to Numerical Embodiment 2 of the present invention is mounted to the master lens.
Figure 4B:
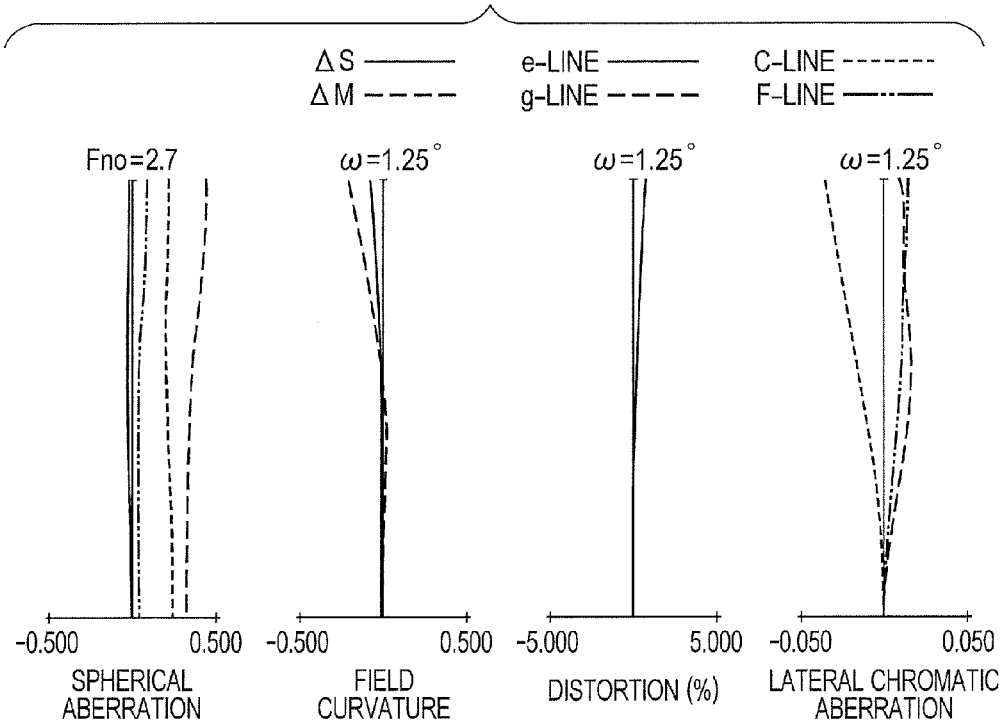
FIG. 4B is an aberration diagram at the telephoto end when the tele-side converter lens according to Numerical Embodiment 2 of the present invention is mounted to the master lens.
Figure 5:
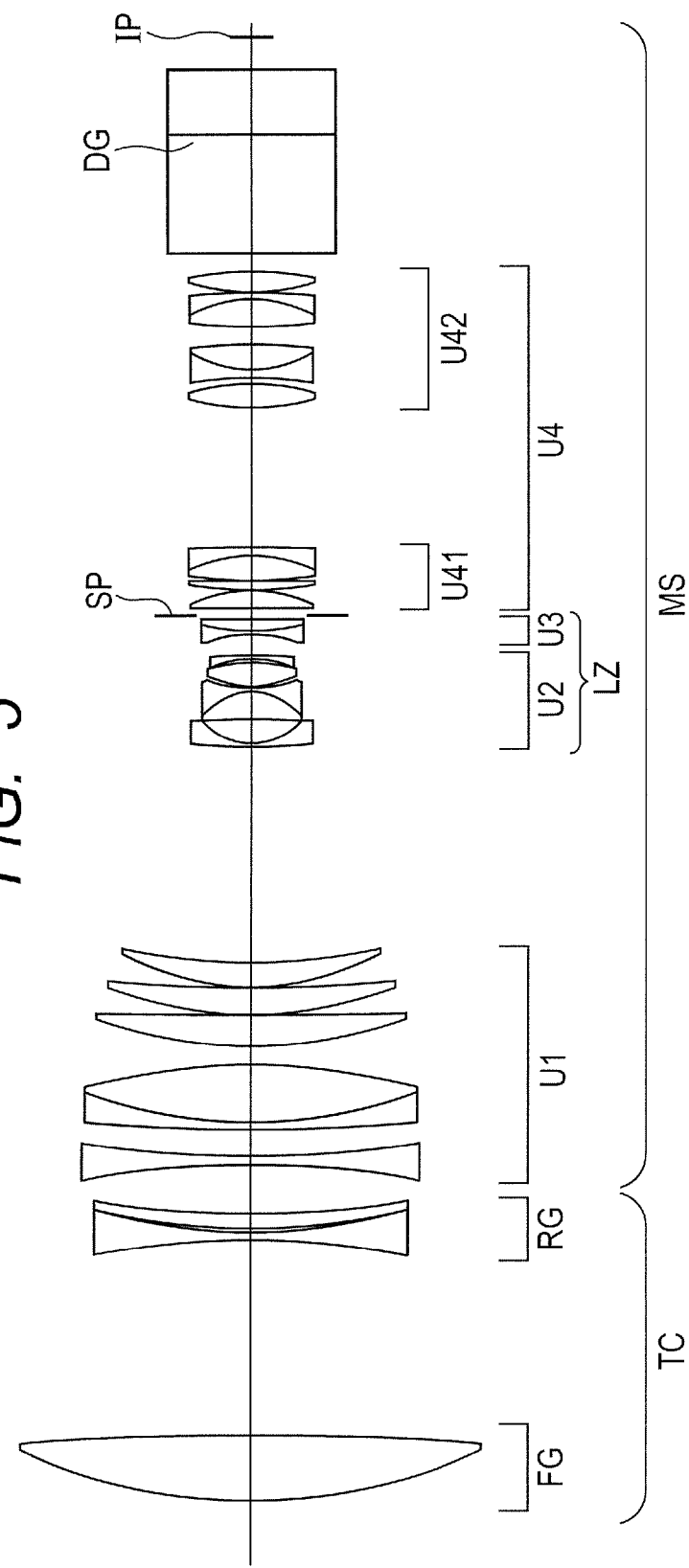
FIG. 5 is a lens cross-sectional view when a tele-side converter lens according to Numerical Embodiment 3 of the present invention is mounted to the master lens at the telephoto end.
Figure 6A:
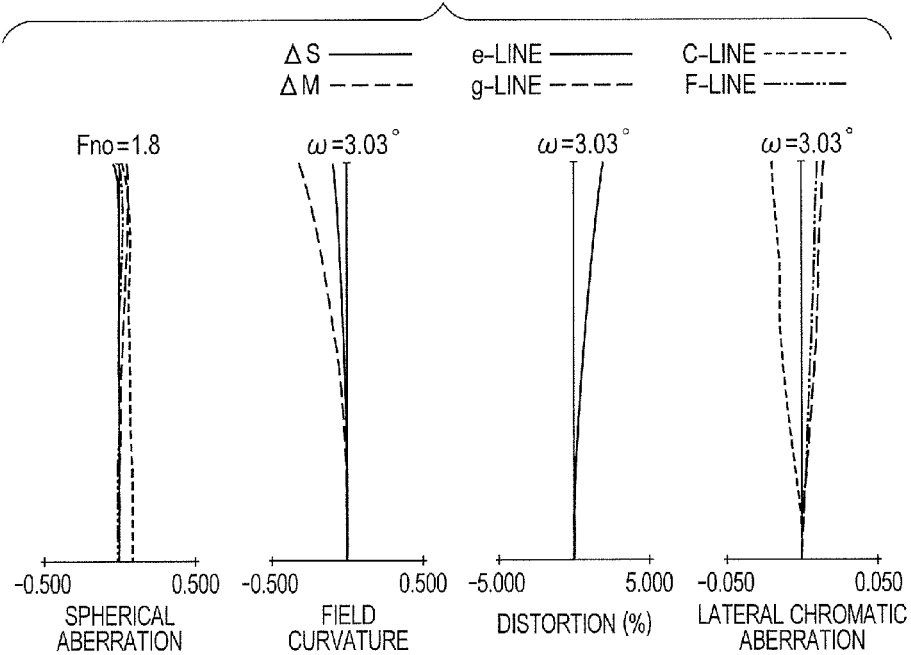
FIG. 6A is an aberration diagram at the intermediate zoom position when the tele-side converter lens according to Numerical Embodiment 3 of the present invention is mounted to the master lens.
Figure 6B:
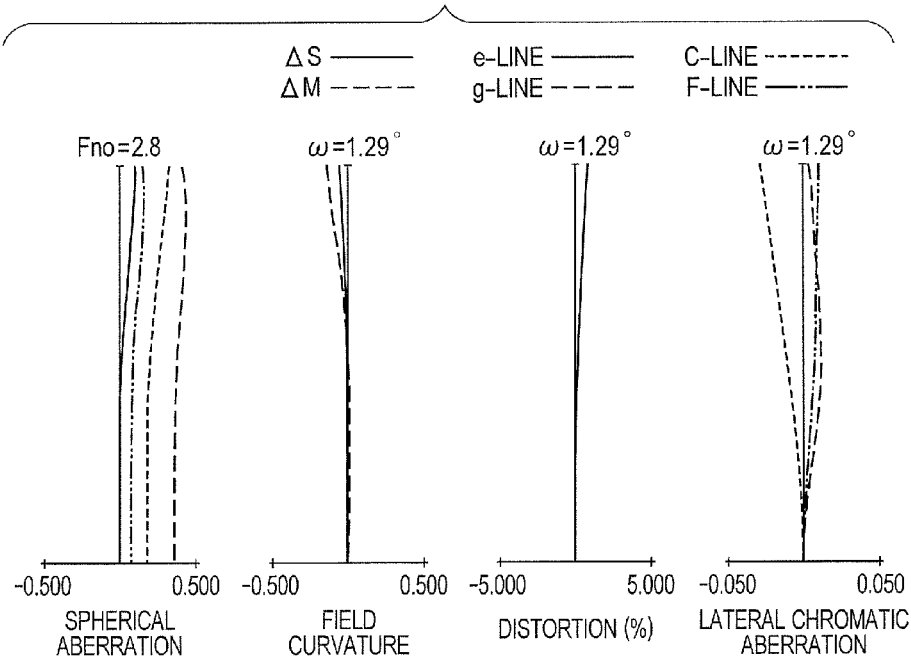
FIG. 6B is an aberration diagram at the telephoto end when the tele-side converter lens according to Numerical Embodiment 3 of the present invention is mounted to the master lens.

FIGS. 4A and 4B are aberration diagrams at a zoom position of at an intermediate zoom position and at a zoom position of a telephoto end when the tele-side converter lens according to Embodiment 2 of the present invention is mounted to the object side of the master lens. FIG. 5 is a lens cross-sectional view at a zoom position of a telephoto end when a tele-side converter lens according to Embodiment 3 of the present invention is mounted to the object side of the master lens. FIGS. 6A and 6B are aberration diagrams at a zoom position of at an intermediate zoom position and at a zoom position of a telephoto end when the tele-side converter lens according to Embodiment 3 of the present invention is mounted to the object side of the master lens.

Figure 7:
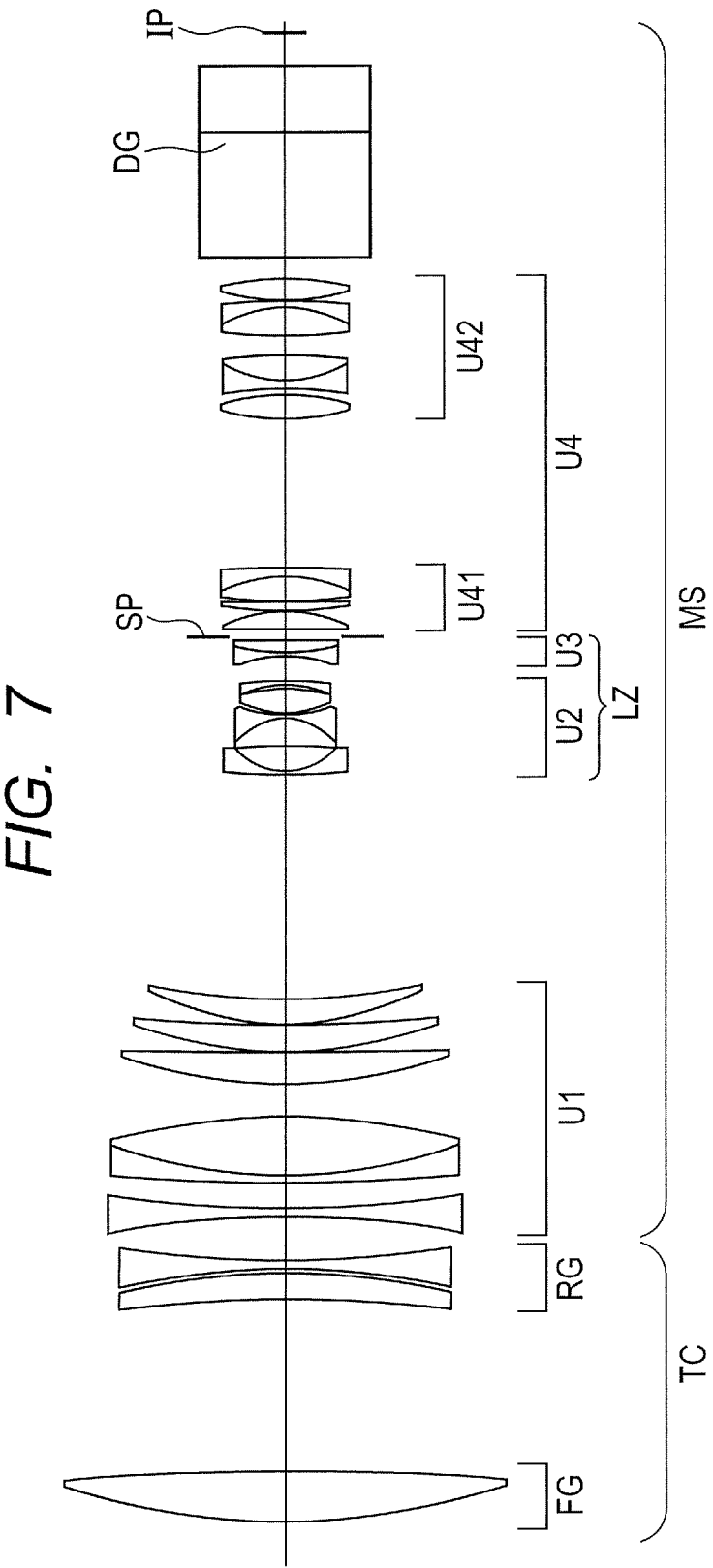
FIG. 7 is a lens cross-sectional view when a tele-side converter lens according to Numerical Embodiment 4 of the present invention is mounted to the master lens at the telephoto end.
Figure 8A:
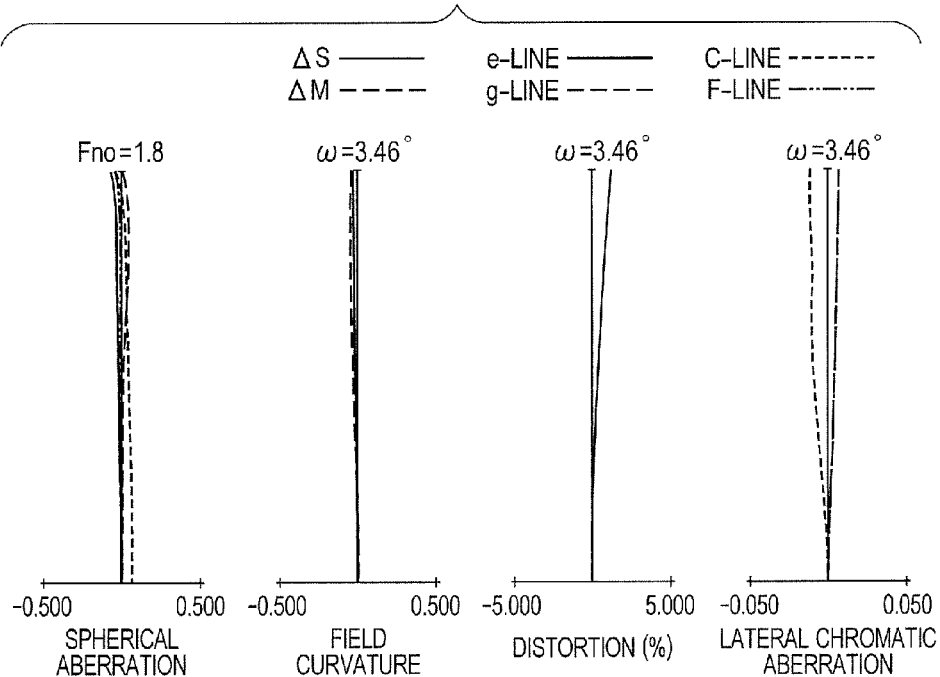
FIG. 8A is an aberration diagram at the intermediate zoom position when the tele-side converter lens according to Numerical Embodiment 4 of the present invention is mounted to the master lens.
Figure 8B:
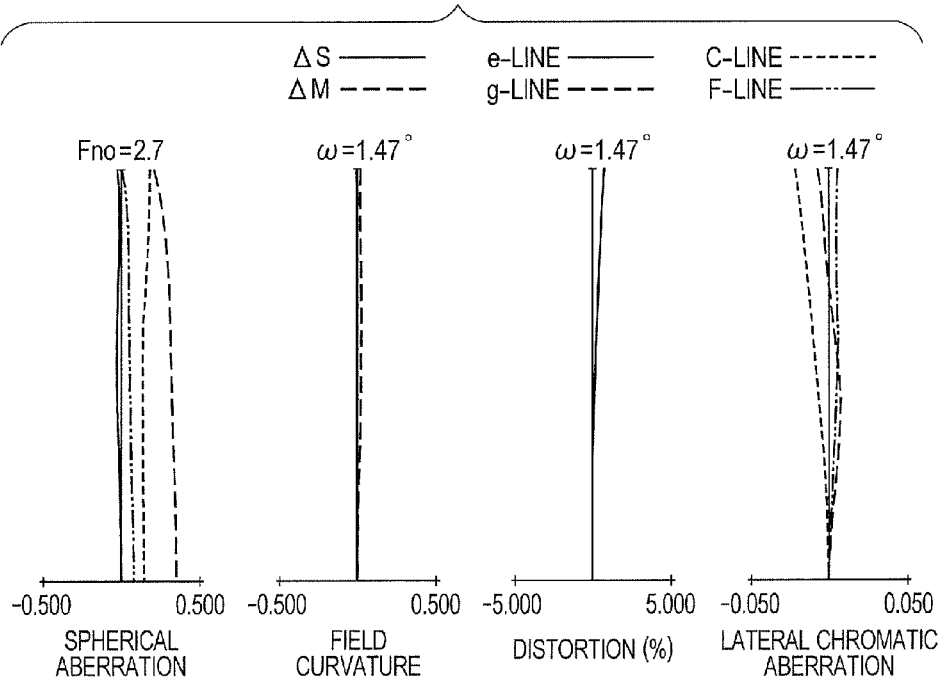
FIG. 8B is an aberration diagram at the telephoto end when the tele-side converter lens according to Numerical Embodiment 4 of the present invention is mounted to the master lens.
Figure 9:
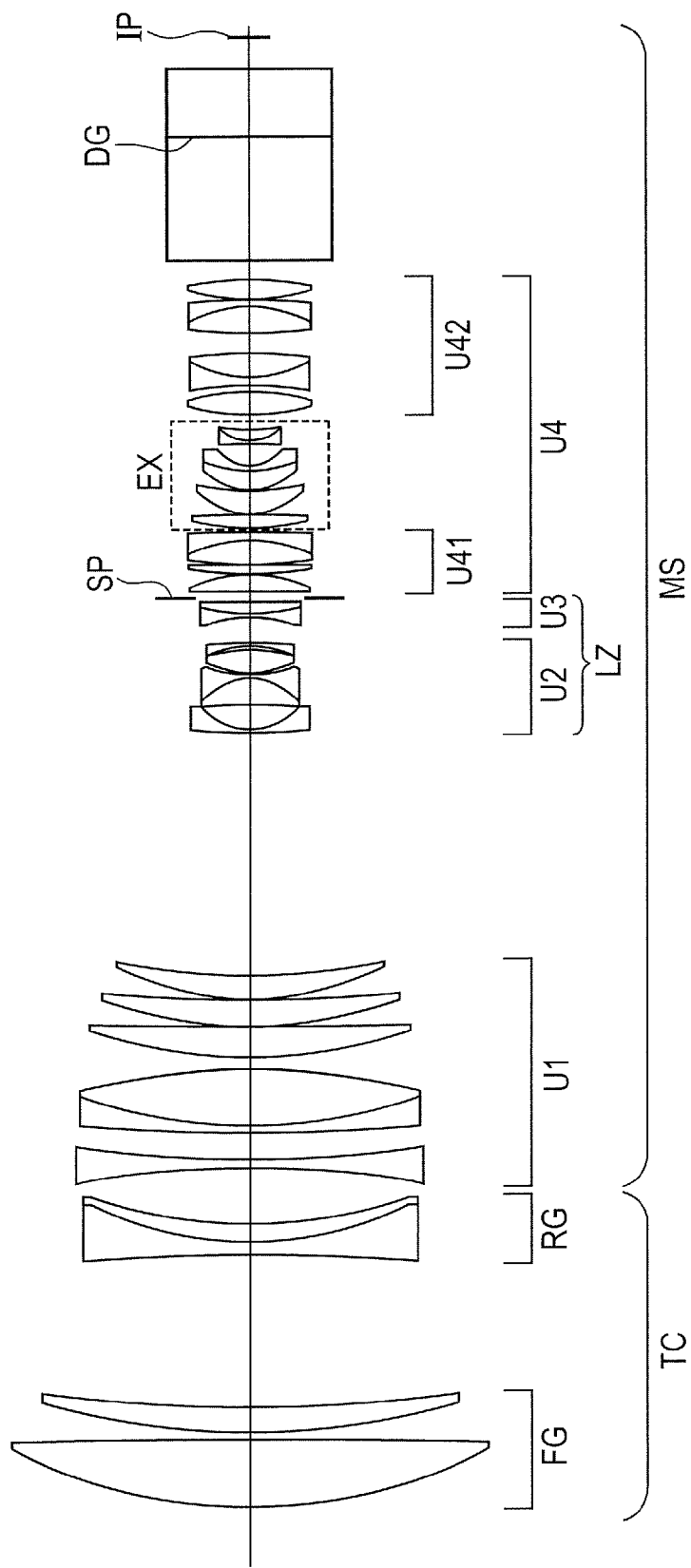
FIG. 9 is a lens cross-sectional view when a tele-side converter lens according to Numerical Embodiment 5 of the present invention is mounted to the master lens at the telephoto end.

FIG. 7 is a lens cross-sectional view at a zoom position of a telephoto end when a tele-side converter lens according to Embodiment 4 of the present invention is mounted to the object side of the master lens. FIGS. 8A and 8B are aberration diagrams at a zoom position of an intermediate zoom position and at a zoom position of a telephoto end, respectively, when the tele-side converter lens according to Embodiment 4 of the present invention is mounted to the object side of the master lens. FIG. 9 is a lens cross-sectional view at a zoom position of a telephoto end when a tele-side converter lens according to Embodiment 5 of the present invention is mounted to the object side of the master lens.

FIGS. 10A and 10B are aberration diagrams at an intermediate zoom position and at a zoom position of the telephoto end, respectively, when the tele-side converter lens according to Embodiment 5 of the present invention is mounted to the object side of the master lens.

In the lens cross-sectional views, the left side is the object side, and the right side is the image side. In the lens cross-sectional views, TC represents a tele-side converter lens, and MS represents a master lens. The tele-side converter lens TC of each embodiment is mounted to the object side of the master lens MS, and makes a focal length of the entire system longer than a focal length of the master lens alone.

The tele-side converter lens TC of each embodiment forms a substantial afocal system. Further, the tele-side converter lens TC includes, in order from the object side to the image side, a first lens unit FG having a positive refractive power (that is the reciprocal of the focal length; optical power) and a second lens unit RG having a negative refractive power, having a largest air interval interposed between the first lens unit and the second lens unit. A principal point interval between the first lens unit FG and the second lens unit RG is set to be equal or substantially equal to the sum of focal lengths of the first lens unit FG and the second lens unit RG, and hence an afocal system is formed as a whole. The first lens unit FG is formed of one or two positive lenses. The second lens unit RG is formed of one negative lens and one or two positive lenses.

A structure of the master lens MS is as follows. In the lens cross-sectional views, U1 represents a first lens unit (focus lens unit) having a positive refractive power which does not move for zooming. The first lens unit U1 performs focusing by moving a part of the lens unit having a refractive power. LZ represents a zoom portion including a lens unit for zooming.

The zoom portion LZ includes a second lens unit (variator lens unit) U2 having a negative refractive power, which moves linearly to the image side for zooming from the wide angle end to the telephoto end. Further, the zoom portion LZ includes a third lens unit (compensator lens unit) U3 having a negative refractive power, which non-linearly moves to the object side for correcting a variation of an image plane position due to magnification-varying. The third lens unit U3 moves on an optical axis for magnification-varying from the wide angle end to the telephoto end in synchronization with movement of the second lens unit U2.

SP represents an aperture stop which is disposed on the image side of the third lens unit U3. U4 represents a fourth lens unit (relay lens unit) having a positive refractive power for forming an image, which does not move for zooming. The fourth lens unit U4 is formed of a fourth-1 lens unit U41, a focal length conversion optical system IE (not shown) which can be inserted and removed from the optical path, and a fourth-2 lens unit U42. DG represents a color separation prism or an optical filter, which is illustrated as a glass block. IP represents an image plane corresponding to an image pickup plane of a solid-state image pickup element (photoelectric transducer).

In the longitudinal aberration diagrams, the spherical aberrations are illustrated for an e-line (solid lines), an F-line (double dot dashed lines), a C-line (broken lines), and a g-line (long broken lines). The astigmatisms are illustrated for a meridional image plane M (long broken lines) and a sagittal image plane S (solid lines) of the e-line. The lateral chromatic aberrations are illustrated for the g-line (long broken lines) and the C-line (broken lines). Fno represents the F-number, and ω represents the half angle of field (degrees).

In the tele-side converter lens TC of each embodiment, an average value of Abbe constants of materials of positive lenses of the first lens unit FG and an average value of partial dispersion ratios thereof are represented by vd1$pa$ and θgF1$pa$, respectively (in a case of a single positive lens, the average values vd1$pa$ and θgF1$pa$ are the respective values of the single positive lens).

An average value of Abbe constants of materials of positive lenses of the second lens unit RG and an average value of partial dispersion ratios thereof are represented by vd2$pa$ and θgF2$pa$ respectively (in a case of a single positive lens, the average values vd2$pa$ and θgF2$pa$ are the respective values of the single positive lens). An Abbe constant of a material of a negative lens of the second lens unit RG and a partial dispersion ratio thereof are represented by vd2$n$ and θgF2$n$, respectively.

A combined Abbe constant of materials of lenses constituting the first lens unit FG is represented by vd1$t$0 (in a case of a single positive lens, the combined Abbe constant value vd1$t$0 is the Abbe constant of the single positive lens). A combined Abbe constant of materials of lenses constituting the second lens unit RG is represented by vd2$t$0. Focal lengths of the first lens unit FG and the second lens unit RG are represented by f1 and f2, respectively. A refractive index of a material of a positive lens disposed closest to the object side is represented by NdG1. A magnification of the tele-side converter lens TC is represented by R.

In this case, the following conditions are satisfied.

$$-12.50 \times 10^* (\theta gF2pa - \theta gF2n)/(vd2pa - vd2n) < -5.50 \times 10^{-3} \quad (1)$$

$$2.05 \times 10^{-3} < (\theta gF1pa - \theta gF2n)/(vd1pa - vd2n) < -1.65 \times 10^{-3} \quad (2)$$

$$-1.05 < (f2 \times vd1t0)/(f1 \times vd2t0) < -0.95 \quad (3)$$

$$22.0 < vd1t0 - vd2n < 32.0 \quad (4)$$

$$10.0 < vd2n - vd2pa < 14.5 \quad (5)$$

$$1.55 < NdG1 \quad (6)$$

$$1.30 < \beta < 1.60 \quad (7)$$

In each embodiment, the lens power layout in the second lens unit FG, dispersion characteristics of materials, and a power layout relationship between the first lens unit FG and the second lens unit RG are appropriately set. Thus, on the telephoto side, achromatism of two colors (primary achromatism) and correction of secondary spectrum of an axial chromatic aberration are appropriately performed. In addition, the first lens unit FG is appropriately formed, and hence the spherical aberration is appropriately corrected by a small number of lenses.

Figure 15:
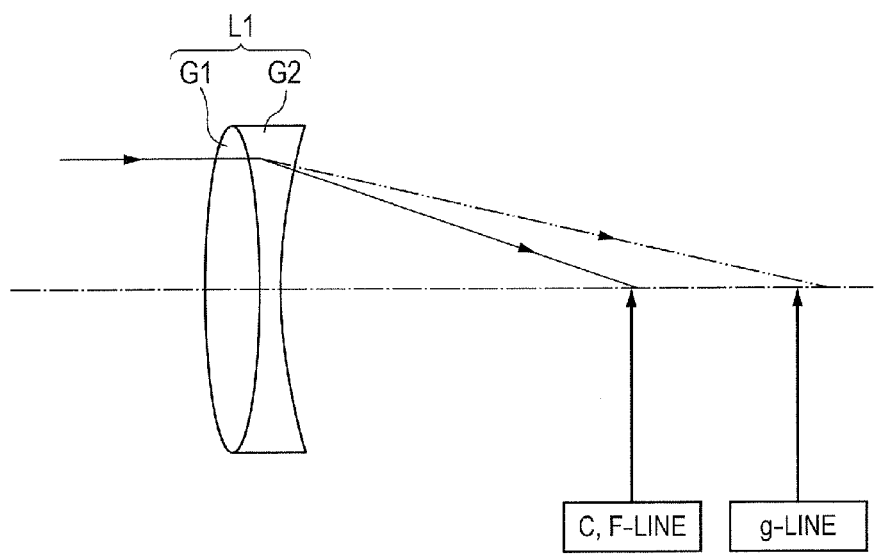
FIG. 15 is a schematic diagram concerning achromatism of two colors and a residual secondary spectrum by a lens having a positive refractive power.

FIG. 15 is an explanatory diagram for describing the primary achromatism and the secondary spectrum of the axial chromatic aberration. FIG. 15 illustrates a schematic diagram concerning the primary achromatism and the residual secondary spectrum of a lens unit having a positive refractive power.

Figure 16:
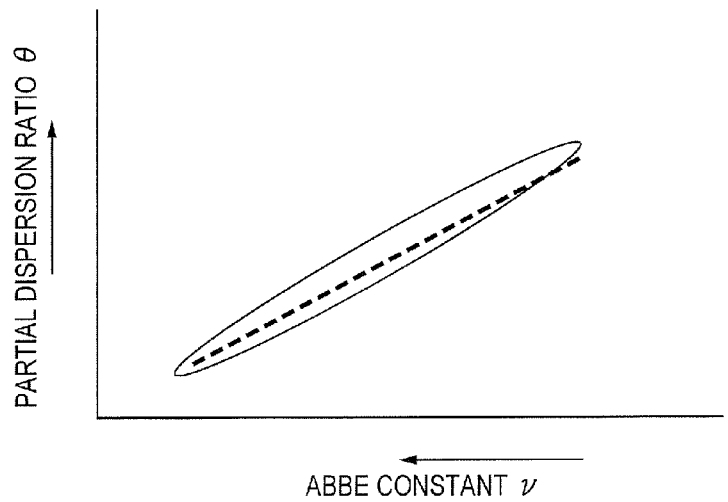
FIG. 16 is a schematic diagram of a distribution of Abbe constants vd and partial dispersion ratios θgF of optical materials.

FIG. 16 shows a schematic diagram of a distribution of Abbe constants vd and partial dispersion ratios θgF of existing optical materials. The region enclosed by an ellipse in FIG. 16 shows a distribution of existing optical materials, which indicates that the existing optical materials are concentrated in vicinity of a standard line shown by a dot line. In this case, the Abbe constant vd and the partial dispersion ratio θgF are calculated by the following equations:

$$vd = (Nd-1)/(NF-NC), \text{ and}$$

$$\theta gF = (Ng-NF)/(NF-NC),$$

where Ng represents a refractive index for the g-line, NF represents a refractive index for the F-line, Nd represents a refractive index for the d-line, and NC represents a refractive index for the C-line.

As shown in FIG. 16, existing optical materials are distributed in a narrow range of the partial dispersion ratios θgF with respect to vd. There is a tendency that the partial dispersion ratio θgF is larger as the Abbe constant vd is smaller. It is supposed that a lens system is formed of two lenses, a combined focal length is represented by f, focal lengths of the two lenses are represented by fG1 and fG2, and Abbe constants of materials of the two lenses are represented by vd1 and vd2. Then, a primary achromatism condition of the thin lens system formed of the two lenses G1 and G2 is expressed by the following equation.

$$1/(fG1 \times vd1) + 1/(fG2 \times vd2) = E \quad (a1)$$

In the equation (a1), when E=0 is satisfied, image forming positions on the C-line and on the F-line are identical with each other.

In FIG. 15, in achromatism of the positive lens unit, a material having a large Abbe constant vd1 is used for the positive lens G1, and a material having a small Abbe constant vd2 is used for the negative lens G2. Therefore, as illustrated in FIG. 15, the positive lens G1 has a small partial dispersion ratio θgF1 while the negative lens G2 has a large partial dispersion ratio θgF2. Therefore, when the chromatic aberration is corrected on the F-line and the C-line, an image formation point for the g-line is shifted to the image side. This shift amount is defined as a secondary spectrum amount of the axial chromatic aberration.

The conditional expression (1) defines an extraordinary partial dispersion property concerning the second lens unit RG of the tele-side converter lens TC. If the upper limit of the conditional expression (1) is exceeded, correction effect of the secondary spectrum of the axial chromatic aberration becomes insufficient, and hence good correction effect of the axial chromatic aberration cannot be sufficiently obtained at the telephoto end. On the contrary, if the lower limit is exceeded, the correction effect of the secondary spectrum of the axial chromatic aberration becomes too large. Therefore, it becomes difficult to suppress a variation of the axial chromatic aberration between before and after mounting of the tele-side converter lens.

The conditional expression (2) defines an extraordinary partial dispersion property between the positive lens constituting the first lens unit FG and the negative lens constituting the second lens unit RG. If the upper limit of the conditional expression (2) is exceeded, the correction effect of the secondary spectrum of the axial chromatic aberration becomes too large. Therefore, it becomes difficult to suppress the variation of the axial chromatic aberration between before and after mounting of the tele-side converter lens. On the contrary, if the lower limit is exceeded, the correction effect of the secondary spectrum of the axial chromatic aberration becomes insufficient. Therefore, the correction effect of the axial chromatic aberration cannot be sufficiently obtained at the telephoto end.

By satisfying the conditional expressions (1) and (2), the secondary spectrum of the axial chromatic aberration is appropriately corrected over the entire tele-side converter lens system. Then, a variation of the secondary spectrum of the axial chromatic aberration can be easily and appropriately suppressed when the tele-side converter lens is mounted to the master lens.

By the conditional expression (3), a ratio between the combined Abbe constant of materials of the first lens unit FG and the combined Abbe constant of materials of the second lens unit RG is normalized by a focal length ratio therebetween, and the conditional expression (3) defines a condition for appropriately performing the primary achromatism for the entire tele-side converter lens.

In this case, the combined Abbe constant vdi of materials of an i-th lens unit (i=1 or 2) is as follows. It is supposed that each of the i-th lens unit is formed of one lens "a" or lenses "a" and "b". In this case, a focal length of the i-th lens unit is represented by fi, focal lengths of the two lenses "a" and "b" constituting the i-th lens unit are represented by fia and fib, respectively, and Abbe constants of materials thereof are represented by vdia and vdib, respectively. In this case, a value indicating a level of dispersion of the i-th lens unit is determined by the following equation.

$$vdi = (1/fi)/\{1/(fia \times vdia) + 1/(fib \times vdib)\}$$

In this embodiment, i=1 or 2.

In other words, when the number of lenses included in the corresponding i-th lens unit is m, a focal length of each lens (the k-th lens from the object side in the i-th lens unit) is represented by fik, and an Abbe constant thereof is represented by vik, the combined Abbe constant vdi of the i-th lens unit is expressed by the following equation.

$$vdi = (1/fi) \Big/ \sum_{k=1}^{m} \{1/(fik \times vik)\}$$

If the condition defined by the conditional expression (3) is not satisfied, it becomes difficult to satisfy the primary achromatism condition in the tele-side converter lens. It becomes difficult to suppress the variation of the axial chromatic aberration between before and after mounting of the tele-side converter lens.

The conditional expression (4) defines a difference between the combined Abbe constant vd1/0 of the first lens unit FG in the tele-side converter lens and the Abbe constant vd2n of the negative lens in the second lens unit RG in the tele-side converter lens. If the upper limit of the conditional expression (4) is exceeded, a correction balance of the chromatic aberration with respect to the positive lens of the second lens unit RG is lost, so that the correction effect of the chromatic aberration becomes too large, As a result, it becomes difficult to suppress the variation of the axial chromatic aberration between before and after mounting of the tele-side converter lens.

On the contrary, if the lower limit is exceeded, refractive power necessary for satisfying the primary achromatism condition is increased. Then, a curvature radius of the lens constituting the first lens unit FG or the second lens unit RG becomes small, and hence a center thickness of the positive lens is increased.

Figure 18:
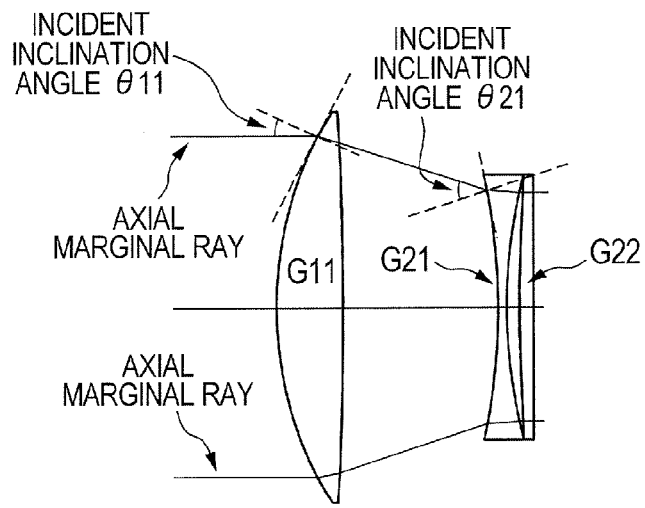
FIG. 18 is a partial optical path diagram at the telephoto end in a state where the tele-side converter lens according to Embodiment 1 of the present invention is mounted to the master lens.

FIG. 18 is an optical path diagram of axial rays at the telephoto end of the tele-side converter lens TC of Embodiment 1. If the curvature radii of lens surfaces of a positive lens G11 and a negative lens G21 illustrated in FIG. 18 become small, incident inclination angles θ11 and θ21 of the axial marginal rays are increased so that high order spherical aberration occurs largely.

In this way, the increase of refractive power of each lens constituting the tele-side converter lens causes the increase of the center thickness of the positive lens and the increase of the high order aberration.

The conditional expression (5) defines a difference between an average Abbe constant of materials of the positive lenses and the Abbe constant of a material of the negative lens constituting the second lens unit RG in the tele-side converter lens TC.

If the upper limit of the conditional expression (5) is exceeded, a correction balance of a chromatic aberration with respect to the first lens unit FG is lost, and hence the correction effect of the chromatic aberration becomes too large. Therefore, it becomes difficult to suppress the variation of the axial chromatic aberration between before and after mounting of the tele-side converter lens. On the contrary, if the lower limit is exceeded, the refractive power necessary for satisfying the primary achromatism condition is increased, and the curvature radius of the lens surface of the lens constituting the second lens unit RG is decreased. As a result, an incident inclination angle of the axial marginal ray passing through the second lens unit RG is increased, the high order spherical aberration occurs largely and the center thickness of the positive lens is increased.

By satisfying the conditional expressions (4) and (5), it becomes easy to appropriately satisfy the primary achromatism over the entire tele-side converter lens system. Then, it becomes easy to suppress the variation of the axial chromatic aberration between before and after mounting of the tele-side converter lens.

The conditional expression (6) defines a refractive index of a material of the positive lens disposed closest to the object side in the tele-side converter lens. If the lower limit of the conditional expression (6) is exceeded, a curvature radius of the lens surface on the object side of the positive lens must be extremely small in order to obtain a predetermined refractive power. As a result, the incident inclination angle of the axial marginal ray is increased, the high order spherical aberration occurs largely, and the lens center thickness is increased.

The conditional expression (7) defines a magnification of the tele-side converter lens TC. If the upper limit of the conditional expression (7) is exceeded, the magnification becomes too large, and hence it becomes difficult to appropriately correct the aberration. On the contrary, if the lower limit is exceeded, the magnification is too small so that the function as the tele-side converter lens becomes insufficient.

In this case, the secondary spectrum of the axial chromatic aberration is increased more as the magnification of the tele-side converter lens is larger. Therefore, it is more preferred to satisfy the following conditional expressions (1a) and (2a) obtained by normalizing the conditional expressions (1) and (2) by the magnification.

$$-5.0\times10^{-3}*\{(\theta gF2pa-\theta gF2n)/(vd2pa-vd2n)\}/<-3.2\times 10^{-3} \quad (1a)$$

$$-1.65\times10^{-3}*\{(\theta gF1pa-\theta gF2n)/(vd1pa-vd2n)\}/\beta<-1.05\times10^{-3} \quad (2a)$$

As described above, according to each embodiment, it becomes easy to achieve both the suppression of the variation of the axial chromatic aberration at the telephoto side when the tele-side converter lens is mounted to the master lens and the downsizing of the tele-side converter lens.

In each embodiment, it is more preferred to satisfy one or more of the following conditions. In a case where the second lens unit RG includes two positive lenses, an Abbe constant of a material of one positive lens and a partial dispersion ratio thereof are represented by vd2 pp and θgF2 pp, respectively. In addition, a focal length of the positive lens having a longer focal length is represented by fGNL, and a focal length of the other positive lens is represented by f2p. A total lens thickness of the tele-side converter lens TC is represented by L, and a total lens thickness of the first lens unit is represented by $Dg\_1$. A curvature radius of the lens surface closest to the object side in the first lens unit FG is represented by $R^{11}$, and a curvature radius of the lens surface closest to the object side in the second lens unit RG is represented by $R21$.

A curvature radius of the lens surface on the object side of the negative lens in the second lens unit RG is represented by $R2nr1$, and a curvature radius of the lens surface on the image side thereof is represented by $R2nr2$. An Abbe constant of the material is represented by $\nu d$, and a partial dispersion ratio thereof is represented by $\theta gF$. A deviation amount $\Delta\theta gF$ from the standard line of the partial dispersion ratio $\theta gF$ is expressed by the following equation.

$$\Delta\theta gF = \theta gF - (-0.00168 \times \nu d + 0.6438) \quad (a2)$$

The deviation amount $\Delta\theta gF$ from the standard line defined here means a difference of the partial dispersion ratio $\theta gF$ from a glass material having the same Abbe constant on the standard line (regardless of the presence thereof). Note that, the standard line means a line satisfying the equation $\theta gF = -0.00168 \times \nu d + 0.6438$. The second lens unit RG includes two positive lenses, and an average value of deviation amounts from the standard line of the partial dispersion ratios of materials of the two positive lenses is represented by $\Delta\theta gF\_pave$. However, in a case of a single positive lens, the average value is the deviation amount of the single positive lens itself. A principal point interval between the first lens unit FG and the second lens unit RG is represented by $e'$. In this case, it is preferred to satisfy one or more of the following conditional expressions.

$$0.10 < Dg\_1/L < 0.35 \quad (8)$$

$$-0.85 < R11/R21 < -0.20 \quad (9)$$

$$0.10 < |(R2nr1 - R2nr2)/(R2nr1 + R2nr2)| < 0.80 \quad (10)$$

$$0.04 < \Delta\theta gF\_pave < 0.08 \quad (11)$$

$$1.20 < L/e' < 1.40 \quad (12)$$

$$2 < fGNL/f2p < 5 \quad (13)$$

$$-2.100 \times 10^{-3} \times \nu d2pp + 0.693 < \theta gF2pp \quad (14)$$

$$\nu d2pp < 30 \quad (15)$$

Next, the technical definition of each of the conditional expressions is described.

The conditional expression (8) defines a total lens thickness of the first lens unit FG in the total lens thickness of the tele-side converter lens TC (a length from the first lens surface on the object side to the final lens surface). If the upper limit of the conditional expression (8) is exceeded, a total thickness and an outer diameter of the lens constituting the first lens unit FG having a largest effective diameter are increased. Then, it becomes difficult to reduce the size and weight of the entire system, which is not appropriate. On the contrary, if the lower limit is exceeded, a lens edge thickness becomes thin when the curvature radius necessary for correcting a spherical aberration is satisfied, which is not appropriate.

The conditional expression (9) defines a relationship between the curvature radius of the lens surface closest to the object side in the first lens unit FG and the curvature radius of the lens surface closest to the object side in the second lens unit RG. If the upper limit of the conditional expression (9) is exceeded, the curvature radius of the lens surface closest to the object side in the second lens unit RG, which corrects a negative spherical aberration generated in the lens surface closest to the object side in the first lens unit FG, is increased, and hence the negative spherical aberration remains largely. As a result, it becomes difficult to suppress the variation of the spherical aberration when the tele-side converter lens is mounted to the master lens.

On the contrary, if the lower limit is exceeded, the curvature radius of the lens surface closest to the object side in the second lens unit RG is decreased, and hence positive spherical aberration, which is generated on the lens surface closest to the object side in the second lens unit RG, remains largely. As a result, it becomes difficult to suppress the variation of the spherical aberration when the tele-side converter lens is mounted to the master lens.

The conditional expression (10) defines a shape factor of the negative lens constituting the second lens unit RG. If the upper limit of the conditional expression (10) is exceeded, the lens shape becomes similar to a meniscus shape. Because the negative lens constituting the second lens unit RG has a large refractive power, the curvature radius of the lens surface becomes smaller as the lens shape approaches to a meniscus shape more. As a result, the incident inclination angle of the axial marginal ray is increased, and hence high order spherical aberration occurs largely. On the contrary, if the lower limit is exceeded, a biconcave shape becomes steep, and hence the curvature radius of the lens surface closest to the object side in the second lens unit RG is decreased. As a result, the incident inclination angle of the axial marginal ray is increased, and hence high order spherical aberration occurs largely.

The conditional expression (11) defines an average value of the deviation amounts $\Delta\theta gF$, which is expressed by the equation (a2), from the standard line of the partial dispersion ratios of the positive lens and a refractive optical element GNL having a positive refractive power in the second lens unit RG of the tele-side converter lens TC. If the upper limit of the conditional expression (11) is exceeded, the correction effect of the secondary spectrum of the axial chromatic aberration becomes too large. Therefore, it becomes difficult to suppress the variation of the axial chromatic aberration between before and after mounting of the tele-side converter lens to the master lens. On the contrary, if the lower limit is exceeded, the correction effect of the secondary spectrum of the axial chromatic aberration becomes insufficient. Therefore, the correction effect of the axial chromatic aberration cannot be sufficiently obtained at the telephoto end, which is not appropriate.

The conditional expression (12) defines a relationship between the entire length L of the tele-side converter lens and the principal point interval $e'$ between the first lens unit FG and the second lens unit RG of the tele-side converter lens TC. If the upper limit of the conditional expression (12) is exceeded, the principal point interval is decreased. Therefore, the refractive power of each lens unit becomes too large, and hence the entire structure includes many lens surfaces having a small curvature radius.

As a result, the curvature radius of each lens is decreased, and the incident inclination angle of the axial marginal ray is increased. Then, high order spherical aberration occurs largely, and the center thickness of the positive lens is increased. On the contrary, if the lower limit is exceeded, the tele-side converter lens has an unnecessarily large size with respect to the master lens to which the tele-side converter lens is mounted, which is not appropriate.

The conditional expression (13) defines a focal length ratio of the two positive lenses in the second lens unit RG. Specifically, the conditional expression (13) defines a ratio between the focal length of the refractive optical element GNL and the focal length of the other positive lens.

If the upper limit of the conditional expression (13) is exceeded, the correction effect of the secondary spectrum of the axial chromatic aberration becomes insufficient, and the correction effect of the axial chromatic aberration cannot be sufficiently obtained at the telephoto end, which is not appropriate. On the contrary, if the lower limit is exceeded, the combined Abbe constant as the second lens unit RG is increased. As a result, the correction balance of a chromatic aberration with respect to the first lens unit FG is lost, and the refractive power necessary for satisfying the primary achromatism condition is increased. As a result, the curvature radius of the lens surface of the lens constituting the second lens unit RG is decreased, and the incident inclination angle of the axial marginal ray is increased. Then, high order spherical aberration occurs largely, and the center thickness of the positive lens is increased, which is not appropriate.

The conditional expressions (14) and (15) define a lens structure of the second lens unit RG and a relationship of the partial dispersion ratio and the Abbe constant of one of two positive lenses included in the second lens unit RG (refractive optical element GNL). By using a solid material having characteristics satisfying the conditional expressions (14) and (15) to form the refractive optical element GNL, the second lens unit RG can have a high extraordinary partial dispersion characteristic with a small refractive power. Thus, it is easy to correct the chromatic aberration.

Details of the master lens MS used in this embodiment are as follows. The master lens MS has a focal length of 164 mm and the f-number Fno of 2.7 at the telephoto end, the half angle of field ω of 1.89 degrees, and a zoom ratio of 20.

Figure 11:
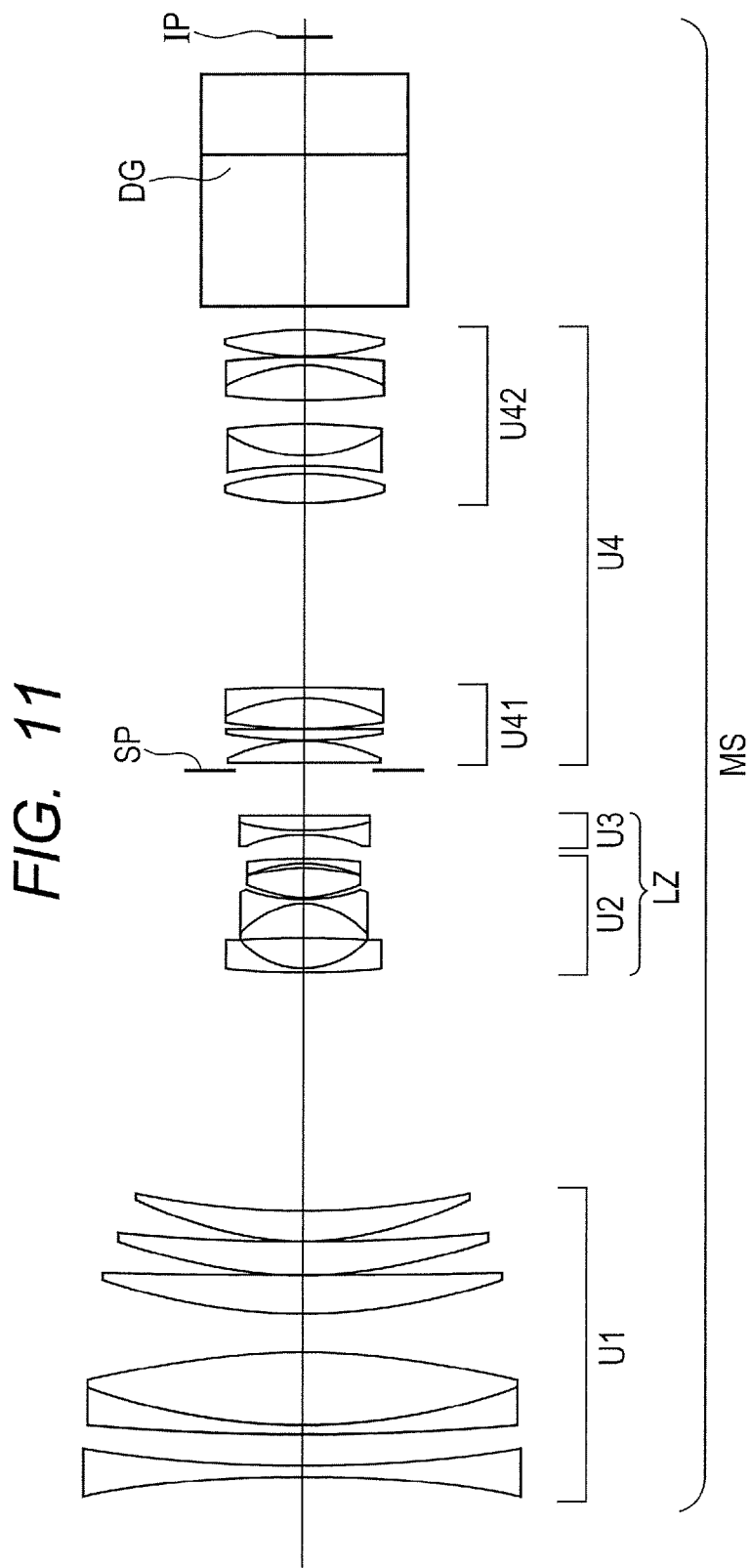
FIG. 11 is a lens cross-sectional view of the master lens at the telephoto end.
Figure 12A:
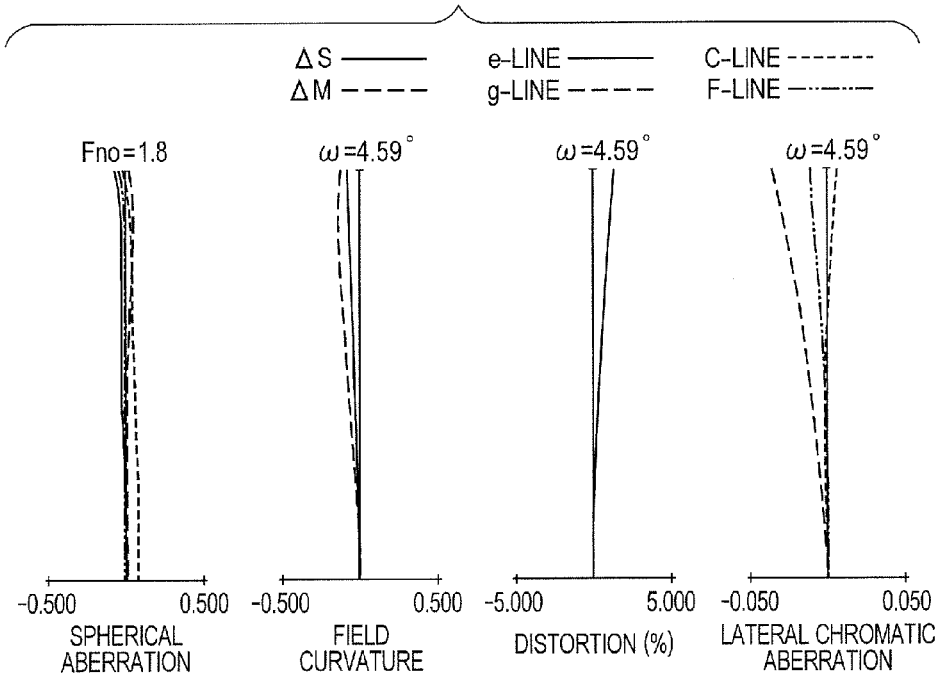
FIG. 12A is an aberration diagram of the master lens at the intermediate zoom position.
Figure 12B:
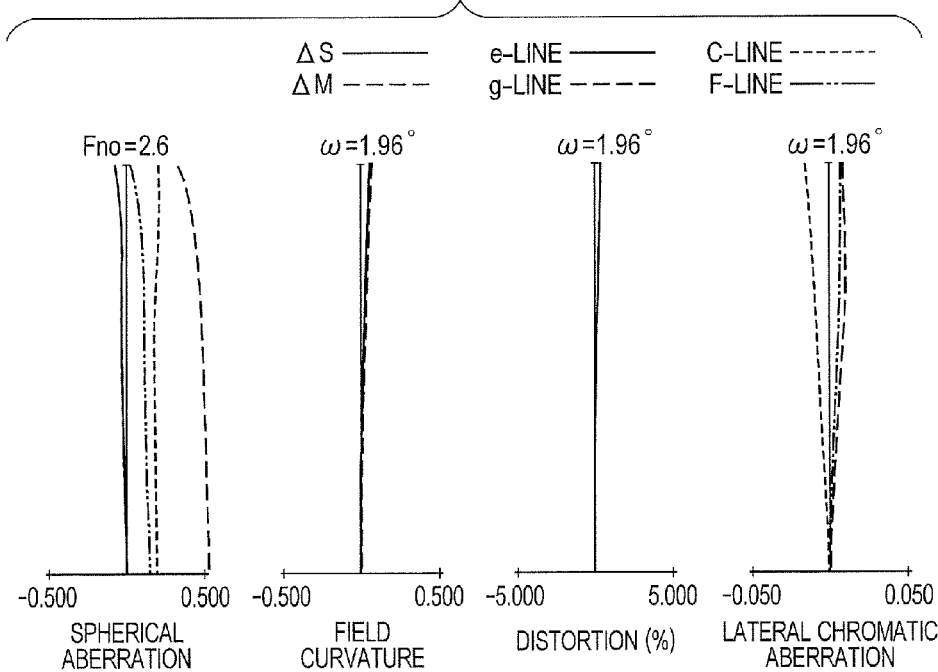
FIG. 12B is an aberration diagram of the master lens at the telephoto end.

FIG. 11 is a lens cross-sectional view of the master lens MS at the telephoto end. FIGS. 12A and 12B are aberration diagrams of the master lens MS at an intermediate zoom position and at a telephoto end, respectively. In addition, FIG. 13 is a lens cross-sectional view at the telephoto end when a magnification-varying optical unit (hereinafter referred to as extender EX) is inserted in the master lens MS.

Figure 13:
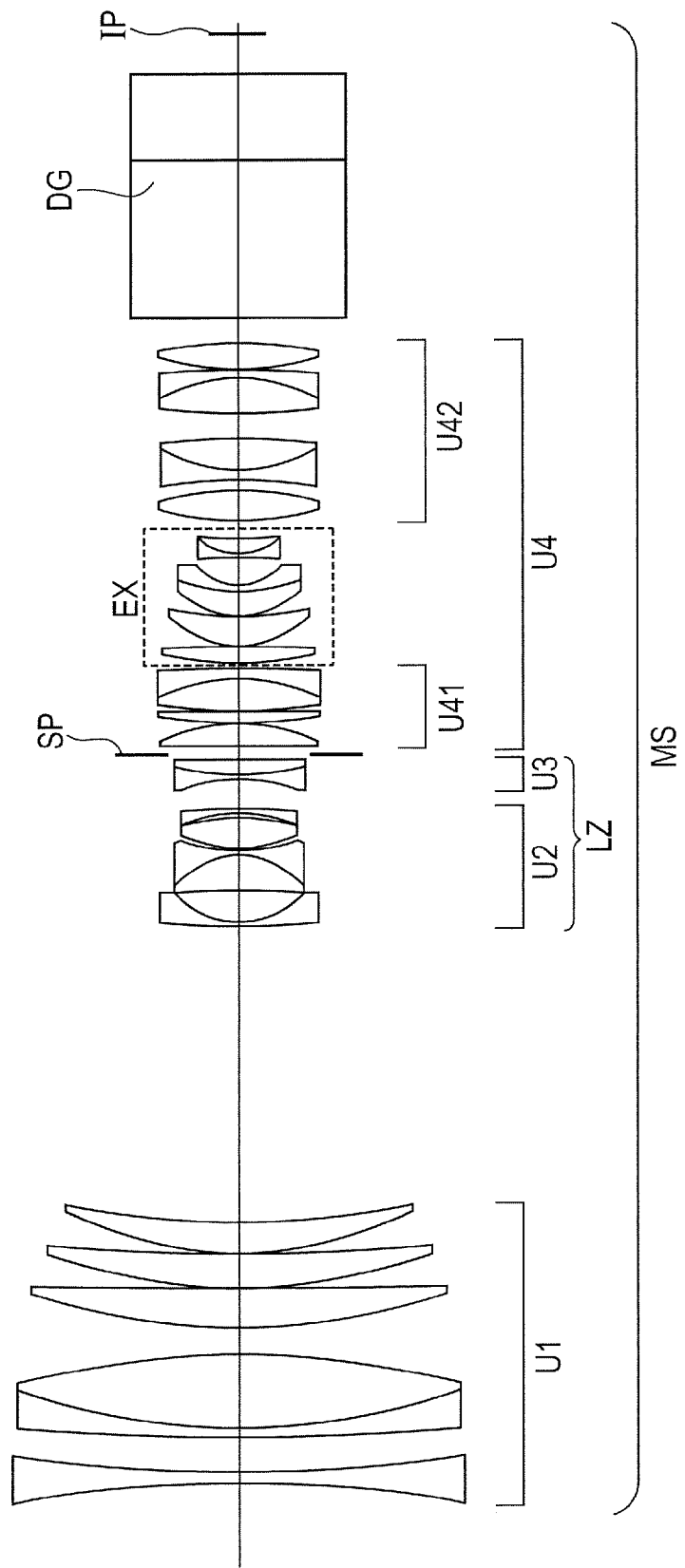
FIG. 13 is a lens cross-sectional view when an extender is inserted in the master lens.
Figure 14A:
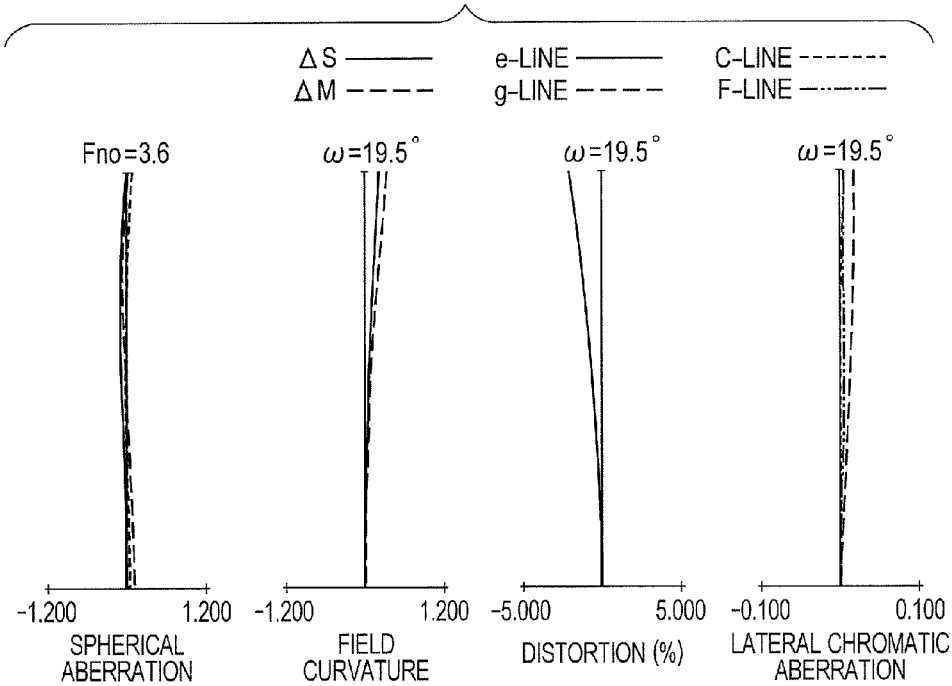
FIG. 14A is an aberration diagram of the master lens at the wide angle end when the extender is inserted.
Figure 14B:
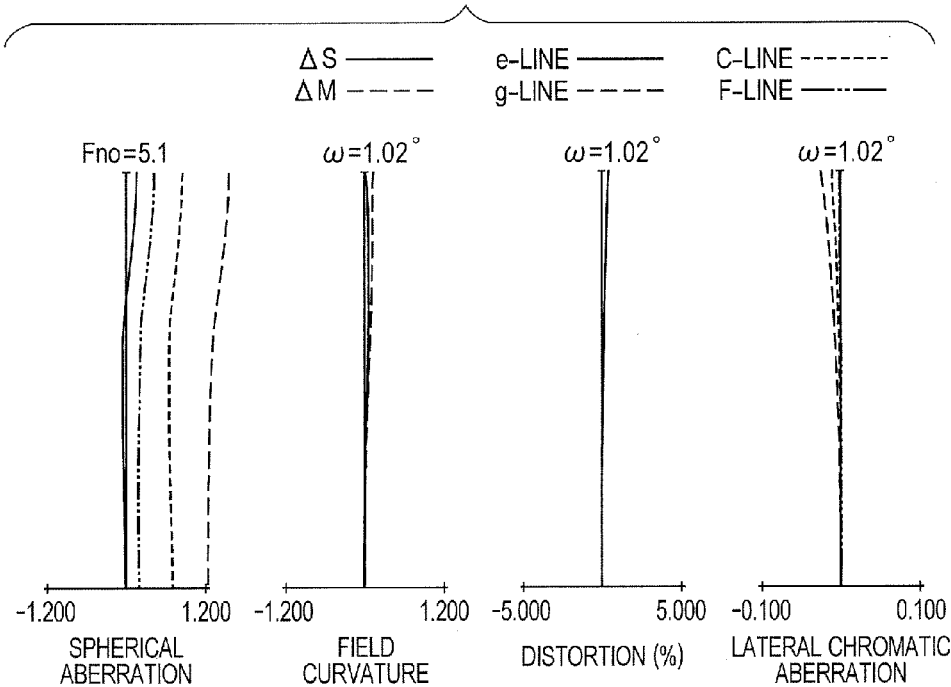
FIG. 14B is an aberration diagram of the master lens at the telephoto end when the extender is inserted.

FIGS. 14A and 14B are aberration diagrams at the wide angle end and at the telephoto end, respectively, in FIG. 13. Note that, the extender EX illustrated in FIG. 13 is removably inserted in the master lens MS so as to substantially double the focal length of the master lens MS.

In the tele-side converter lens of each embodiment, the entire system is downsized on the precondition of using the tele-side converter lens on the telephoto side having a small photography angle of field. Therefore, vignetting occurs in the light beam in the periphery of the screen on the wide angle side. However, in consideration of usability, when the extender is inserted, the tele-side converter lens can be used in the entire zoom range. Here, when the tele-side converter lens TC is mounted to the master lens in which the extender EX is inserted, the light beam height of the off-axis rays is restricted by a diameter (φG1) of the lens closest to the object side in the tele-side converter lens.

Figure 19A:
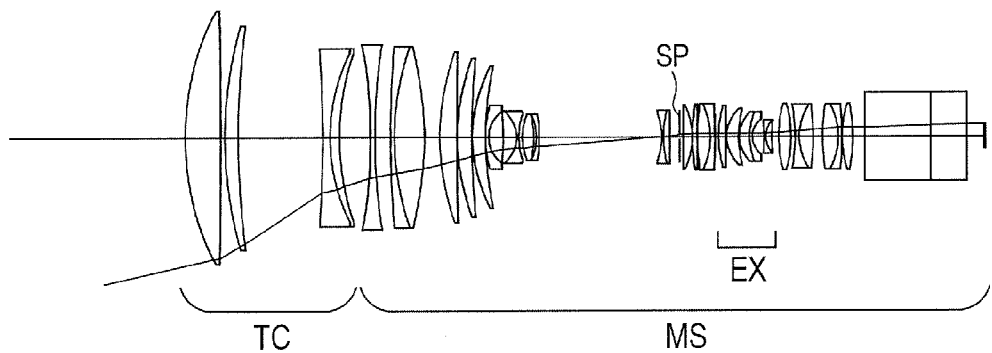
FIG. 19A is an optical path diagram of off-axis rays at the telephoto end in which the object distance is infinity and the F-number is 22.63 when an effective diameter of the tele-side converter lens according to Embodiment 5 is determined so that φray=0.521 mm is satisfied.
Figure 19B:
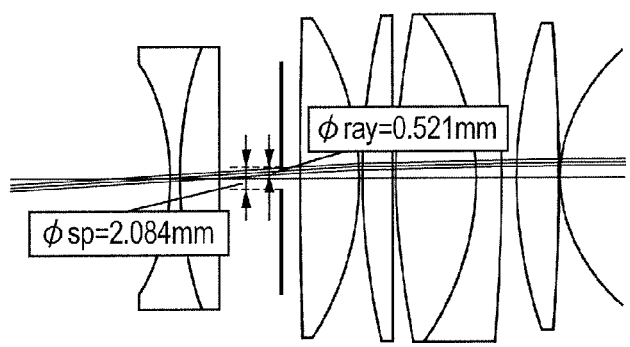
FIG. 19B is an enlarged view of the optical path diagram of off-axis rays in the vicinity of an aperture stop at the telephoto end in which the object distance is infinity and the F-number is 22.63 when the effective diameter of the tele-side converter lens according to Embodiment 5 is determined so that φray=0.521 mm is satisfied.

Therefore, in order that vignetting does not Occur in the entire zoom range when the tele-side converter lens TC is mounted to the master lens MS in which the extender EX is inserted, it is necessary to appropriately determine the lens system φG1. As to the effective diameter of each Numerical Embodiment, the F-number of the master lens MS is decreased to be 22.63 defined by JIS (Japanese Industrial Standard) (aperture diameter φsp is decreased to 2.084 mm) as illustrated in FIGS. 19A and 19B.

In this case, it is determined that the beam diameter φray at the aperture stop position is 25% of the aperture diameter or larger (light flux diameter φray is 0.521 mm or larger) over the entire zoom range.

Figure 17A:
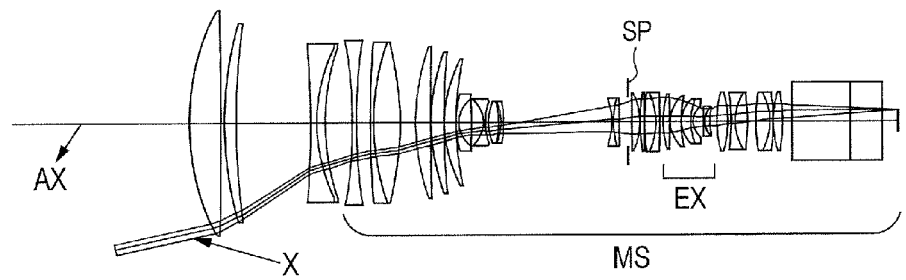
FIG. 17A is an optical path diagram of off-axis rays at the wide angle end when an object distance of Embodiment 5 of the present invention is infinity.
Figure 17B:
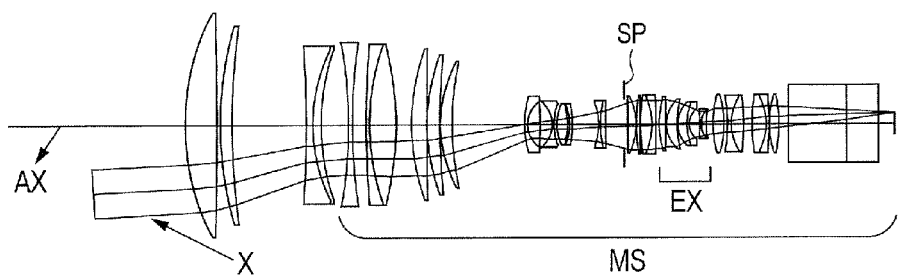
FIG. 17B is an optical path diagram of off-axis rays at the intermediate zoom position when the object distance of Embodiment 5 of the present invention is infinity.
Figure 17C:
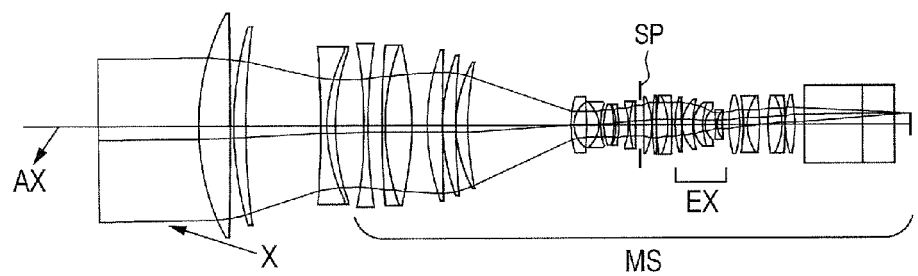
FIG. 17C is an optical path diagram of off-axis rays at the telephoto end when the object distance of Embodiment 5 of the present invention is infinity.

FIGS. 17A, 17B, and 17C are optical path diagrams of off-axis rays at a reference wavelength (e-line) forming an image of the largest image height at the wide angle end, the intermediate zoom position, and the telephoto end when the tele-side converter lens TC according to Numerical Embodiment 5 is mounted to the master lens MS in which the extender EX is inserted. From FIGS. 17A, 17B, and 17C, it is understood that an off-axial marginal ray X passes through below an optical axis AX at the position of the aperture stop SP in each zoom position, and hence vignetting does not occur.

Figure 20A:
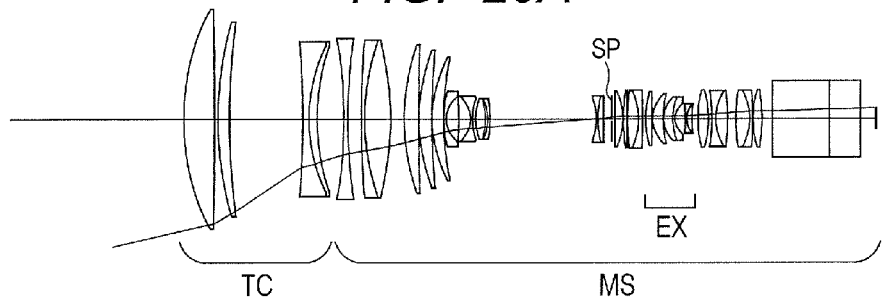
FIG. 20A is an optical path diagram of off-axis rays at the telephoto end in which the object distance is infinity and the F-number is 22.63 when the effective diameter of the tele-side converter lens according to Embodiment 5 is determined so that φray=1.042 mm is satisfied.
Figure 20B:
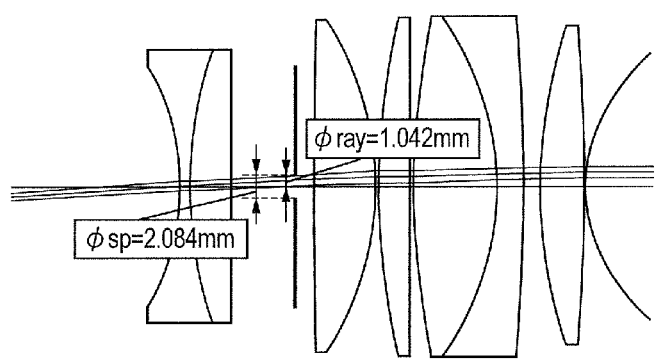
FIG. 20B is an enlarged view of the optical path diagram of off-axis rays in the vicinity of the aperture stop at the telephoto end in which the object distance is infinity and the F-number is 22.63 when the effective diameter of the tele-side converter lens according to Embodiment 5 is determined so that φray=1.042 mm is satisfied.

Note that, as illustrated in FIGS. 20A and 20B, it is preferred that the F-number of the master lens MS be decreased to 22.63 defined by JIS (the aperture diameter is decreased to 2.084 mm). In this case, it is desired to determine the beam diameter φray at the aperture stop SP position to be 50% of the aperture diameter or larger (the light flux diameter φray to be 1.042 mm or larger) over the entire zoom range.

Here, in order to express a correction degree of the chromatic aberration, a coefficient $\Delta sk$ expressed by the equation (a3) is used. In the equation (a3), $\Delta sk(g-e)tm$ represents a difference of the image forming position between the g-line and the e-line at the telephoto end of the master lens MS, and $\Delta sk(g-e)tc$ represents a difference of the image forming position between the g-line and the e-line at the telephoto end when the tele-side converter lens TC is mounted to the master lens MS.

The tele-side converter lens of the present invention appropriately corrects the chromatic aberration at the telephoto side by setting the coefficient $\Delta sk$ to satisfy the conditional expression (16).

$$\Delta sk = \Delta sk(g-e)tc / \Delta sk(g-e)tm \tag{a3}$$

$$0.80 < \Delta sk < 1.20 \tag{16}$$

It is more preferred in each embodiment to set the numerical value ranges of the conditional expressions (1) to (15) and the conditional expressions (1a) and (2a) as follows.

$$-8.50 \times 10^{-3} < (\theta gF2pa - \theta gF2n)/(\nu d2pa - \nu d2n) < -5.50 \times 10^{-3} \tag{1b}$$

$$-2.00 \times 10^{-3} < (\theta gF1pa - \theta gF2n)/(\nu d1pa - \nu d2n) < -1.70 \times 10^{-3} \tag{2b}$$

$$-1.03 < (f2 \times \nu d1t0)/(f1 \times \nu d2t0) < -0.96 \tag{3b}$$

$$23.00 < \nu d1t0 - \nu d2n < 31.60 \tag{4b}$$

$$10.20 < \nu d2n - \nu d2pa < 14.20 \tag{5b}$$

$$1.55 < NdG1 < 1.88 \tag{6b}$$

$$1.40 < \beta < 1.57 \tag{7b}$$

$$0.21 < Dg\_1/L < 0.33 \tag{8b}$$

$$-0.60 < R11/R21 < -0.25 \tag{9b}$$

$$0.15 < |(R2nr1 - R2nr2)/(R2nr1 + R2nr2)| < 0.50 \tag{10b}$$

$$0.04 < \Delta\theta gF\_pave < 0.07 \tag{11b}$$

$$1.22 < L/e' < 1.35 \tag{12b}$$

$$2.80 < fGNL/f2p < 4.00 \tag{13b}$$

$$0.50 < \theta gF2pp - (-2.100 \times 10^{-3} \times \nu d2pp + 0.693) < 1.20 \tag{14b}$$

$$20.0 < \nu d2pp < 26.0 \tag{15b}$$

$$0.88 < \Delta sk < 1.15 \tag{16}$$

$$-4.80 \times 10^{-3} < \{(\theta gF2pa - \theta gF2n)/(\nu d2pa - \nu d2n)\} < -3.60 \times 10^{-3} \tag{1ab}$$

$$-1.55 \times 10^{-3} < \{(\theta gF1pa - \theta gF2n)/(\nu d1pa - \nu d2n)\} < -1.10 \times 10^{-3} \tag{2ab}$$

Embodiment 1

FIG. 1 is a lens cross-sectional view when the tele-side converter lens TC according to Embodiment 1 of the present invention is mounted to the object side of the master lens MS with an interval of 8.00 mm on the optical axis. FIGS. 2A and 2B are aberration diagrams at the intermediate zoom position (at a focal length of 68.5 mm of the master lens MS) and at the telephoto end when the tele-side converter lens TC according to Embodiment 1 is mounted to the master lens MS. The tele-side converter lens TC forms an afocal system or a substantially afocal system. The tele-side converter lens TC is formed of the first lens unit FG having a positive refractive power and the second lens unit RG having a negative refractive power.

The first lens unit FG is formed of a biconvex positive lens. In addition, the second lens unit RG is formed of a biconcave negative lens and a positive meniscus lens having a convex surface facing toward the object side. Substituting numerical values of Numerical Embodiment 1 into the conditional expressions (1) to (12), the values shown in Table 2 as Numerical Embodiment 1 are obtained, which satisfy all the conditional expressions. In addition, the coefficient Δsk becomes 1.09 in Embodiment 1, and hence it is understood that the chromatic aberration is appropriately corrected at the telephoto side.

In each embodiment, the refractive optical element means a refractive lens or the like, for example, which has power by a refraction effect, but does not include a diffractive optical element, which has power by a diffraction effect. In addition, the positive refractive optical element shows that the element has a positive refractive power when the element exists in the air. Here, the solid material forming the refractive optical element GNL is in a solid state when the optical system is used, but may be in any state before the optical system is used, namely, in the manufacturing process, for example. For instance, a liquid material may be used in the manufacturing process and may be cured to be the solid material.

Embodiment 2

FIG. 3 is a lens cross-sectional view when the tele-side converter lens TC according to Numerical Embodiment 2 of the present invention is mounted to the object side of the master lens MS. FIGS. 4A and 4B are aberration diagrams at the intermediate zoom position and at the telephoto end when the tele-side converter lens TC according to Numerical Embodiment 2 is mounted to the master lens MS with an interval of 8.00 mm on the optical axis. Numerical Embodiment 2 has a lens structure similar to that of Numerical Embodiment 1 and has a magnification of 1.56.

Substituting numerical values of Numerical Embodiment 2 into the conditional expressions (1) to (12), the values shown in Table 2 as Numerical Embodiment 2 are obtained, which satisfy all the conditional expressions. In addition, Δsk in this embodiment becomes 1.10, and hence it is understood that the chromatic aberration on the telephoto side is appropriately corrected.

Embodiment 3

FIG. 5 is a lens cross-sectional view when the tele-side converter lens TC according to Numerical Embodiment 3 of the present invention is mounted to the object side of the master lens MS. FIGS. 6A and 6B are aberration diagrams at the intermediate zoom position and at the telephoto end when the tele-side converter lens TC according to Numerical Embodiment 3 is mounted to the master lens MS with an interval of 12.00 mm on the optical axis.

Numerical Embodiment 3 has a lens structure similar to that of Numerical Embodiment 1, in which the second lens unit is formed of a cemented lens in which, in order from the object side, a biconcave negative lens, a positive refractive optical element GNL made of a solid material, and a positive meniscus lens having a convex surface facing toward the object side are cemented. The positive refractive optical element GNL in Numerical Embodiment is made of a solid material having an extraordinary partial dispersion property, which is the solid material (1) shown in Table 1 satisfying the conditional expressions (14) and (15).

Substituting numerical values of Numerical Embodiment 3 into the conditional expressions (1) to (13), the values shown in Table 2 as Numerical Embodiment 3 are obtained, which satisfy all the conditional expressions. In addition, Δsk in this embodiment becomes 1.09, and hence it is understood that the chromatic aberration on the telephoto side is appropriately corrected.

Embodiment 4

FIG. 7 is a lens cross-sectional view when the tele-side converter lens TC according to Numerical Embodiment 4 of the present invention is mounted to the object side of the master lens MS. FIGS. 8A and 8B are aberration diagrams at the intermediate zoom position and at the telephoto end when the tele-side converter lens TC according to Numerical Embodiment 4 is mounted to the master lens MS with an interval of 10.00 mm on the optical axis. Numerical Embodiment 4 has a lens structure similar to that of Numerical Embodiment 1 and has a magnification of 1.33.

In addition, the second lens unit RG has a positive meniscus lens having a convex surface facing toward the image plane side and a biconcave negative lens disposed in this order from the object side In this way, when the second lens unit RG has the structure in which the positive lens and the negative lens are disposed in this order from the object side the same effect can be obtained. Substituting numerical values of Numerical Embodiment 4 into the conditional expressions (1) to (12), the values shown in Table 2 as Numerical Embodiment 4 are obtained, which satisfy all the conditional expressions. In addition, Δsk in this embodiment becomes 1.04, and hence it is understood that a chromatic aberration on the telephoto side is appropriately corrected.

Embodiment 5

FIG. 9 is a lens cross-sectional view when the tele-side converter lens TC according to Numerical Embodiment 5 of the present invention is mounted to the object side of the master lens MS in which the extender EX is inserted. FIGS. 10A and 10B are aberration diagrams at the intermediate zoom position and at the telephoto end when the tele-side converter lens TC according to Numerical Embodiment 5 is mounted to the master lens MS in which the extender EX is inserted with an interval of 13.50 mm on the optical axis.

As to Numerical Embodiment 5, the first lens unit FG includes a biconvex positive lens and a positive meniscus lens having a convex surface facing toward the object side. In addition, the second lens unit RG is formed of a cemented negative lens in which, in order from the object side, a biconcave negative lens and a positive meniscus lens having a convex surface facing toward the object side are cemented. By dividing the first lens unit FG into two in this way, it is easy to improve the performance by sharing aberration correction of the first lens unit FG. In addition, the same effect as in Embodiment 1 can be obtained by the structure of the second lens unit RG formed of the cemented lens as in this embodiment.

By substituting numerical values of Numerical Embodiment 5 into the conditional expressions (1) to (12), the values shown in Table 2 as Numerical Embodiment 5 are obtained, which satisfy all the conditional expressions. In addition, Δsk in this embodiment becomes 0.92, and hence it is understood that a chromatic aberration on the telephoto side is appropriately corrected.

Figure 21:
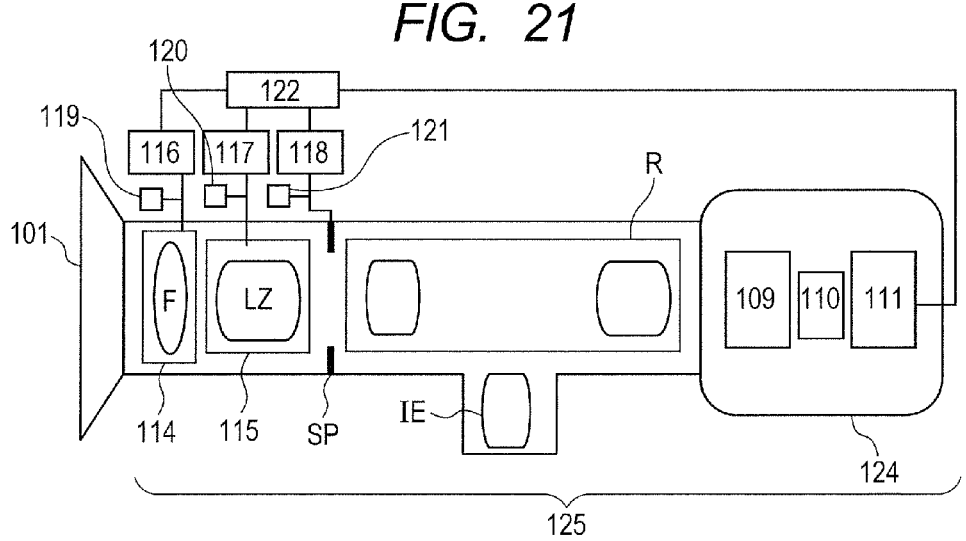
FIG. 21 is a schematic diagram of a main part of an image pickup apparatus according to the present invention.

FIG. 21 is a schematic diagram of an image pickup apparatus (TV camera system) employing the zoom lens of each embodiment as a photographing optical system. FIG. 21 illustrates a zoom lens 101 including the teleconverter lens according to any one of Embodiments 1 to 5, and a camera 124. The zoom lens 101 is removably mounted to the camera 124. The zoom lens 101 is mounted to the camera 124 to form an image pickup apparatus 125.

The zoom lens 101 includes a first lens unit F, a magnification-varying portion (zoom portion) LZ, and a fourth lens unit (relay portion) R for image formation. The first lens unit F includes a focus lens unit. The magnification-varying portion LZ includes a second lens unit which moves on the optical axis for varying magnification, and a third lens unit which moves on the optical axis for correcting an image plane variation due to magnification-varying. An aperture stop is represented by SP. The fourth lens unit R includes a focal length conversion optical system (extender) IE that can be inserted/removed into/from an optical path. Through insertion/removal of the focal length conversion optical system IE into/from the optical path, a focal length range of the entire system of the zoom lens 101 is changed.

The zoom lens 101 also includes driving mechanisms 114 and 115, such as helicoids and cams, for driving the first lens unit F and the magnification-varying portion LZ, respectively, in the optical axis direction. The image pickup apparatus 125 includes motors (driving units) 116 and 117 for the driving mechanisms 114 and 115, and a motor (driving unit) 118 for electrically driving the aperture stop SP. The image pickup apparatus 125 also includes detectors 119 to 121, such as an encoder, a potentiometer, or a photo-sensor, which are configured to detect the positions of the first lens unit F and the magnification-varying portion LZ on the optical axis, and the aperture diameter of the aperture stop SP.

The camera 124 includes a glass block 109, which corresponds to an optical filter or a color separating optical system inside the camera 124. Further, the camera 124 includes a solid-state image pickup element (photoelectric transducer) 110, such as a charge-coupled device (CCD) sensor or a complementary metal-oxide semiconductor (CMOS) sensor. The solid-state image pickup element 110 is configured to receive a subject image formed by the zoom lens 101. Further, central processing units (CPUs) 111 and 122 control various types of driving of the camera 124 and the zoom lens 101, respectively. Through application of the zoom lens according to the present invention to a TV camera as described above, an image pickup apparatus having high optical performance is realized.

Next, Numerical Embodiments 1 to 5 corresponding respectively to Embodiments 1 to 5 of the present invention and a numerical value example of the master lens M are described below. In each Numerical Embodiment, surface number i indicates the order of an optical plane from the object side. Symbol r represents a curvature radius of the optical plane; d, a plane interval; and nd and vd, a refractive index and an Abbe constant of a material of an optical member with respect to the d-line, respectively. Symbol θgF represents a partial dispersion ratio. In Numerical Embodiments 1 to 4, d6 represents an interval to the master lens when the tele-side converter lens is mounted to the master lens. In Numerical Embodiment 5, d7 represents an interval to the master lens when the teleconverter lens is mounted to the master lens.

The back focus (BF) is an air-converted value of the distance between the lens final surface and the paraxial image plane. The total lens length is defined to be a value obtained by adding the back focus (BF) to a distance between the lens front surface and the lens final surface. A unit of length is mm. In addition, K represents an eccentricity, Ai represents an aspherical coefficient, and a displacement in the optical axis direction at a position of height H from the optical axis with respect to a surface apex is represented by x. Then, the aspherical shape is expressed by the following equation.

$$X = \frac{(1/R)H^2}{1 + \sqrt{1 - (1+K)(H/R)^2}} +$$

$$A3 \cdot H^3 + A4 \cdot H^4 + A5 \cdot H^5 + A6 \cdot H^6 + \ldots Ai \cdot H^i$$

where R represents a curvature radius. Further, for example, the expression of "E-Z" means "$10^{-z}$". The refractive index, the Abbe constant, and the partial dispersion ratio of the solid material used in each embodiment are shown in Table 1. In addition, correspondence between the refractive index, the Abbe constant, and the partial dispersion ratio and the above-mentioned conditional expressions in each Numerical Embodiment is shown in Table 2.

(Numerical Embodiment 1)
Magnification 1.47

| Surface No. | Effective diameter | Curvature radius | d | nd | vd | θgF | Focal length |
|---|---|---|---|---|---|---|---|
| 1 | 108.4 | 107.026 | 18.56 | 1.5891 | 61.14 | 0.5406 | 164.287 |
| 2 | 108.6 | −986.528 | 39.87 | 1.0000 | air | | |
| 3 | 78.1 | −235.568 | 2.19 | 1.9037 | 31.32 | 0.5947 | −85.999 |
| 4 | 75.7 | 117.805 | 3.07 | 1.0000 | air | | |
| 5 | 75.7 | 219.267 | 4.31 | 1.9409 | 17.40 | 0.6775 | 354.476 |
| 6 | 75.6 | 618.348 | 8.00 | 1.0000 | air | | |

(Numerical Embodiment 2)
Magnification 1.56

| Surface No. | Effective diameter | Curvature radius | d | nd | vd | θgF | Focal length |
|---|---|---|---|---|---|---|---|
| 1 | 120.7 | 119.494 | 21.23 | 1.6516 | 58.55 | 0.5426 | 173.251 |
| 2 | 120.4 | −2049.597 | 49.50 | 1.0000 | air | | |
| 3 | 78.0 | −230.925 | 2.10 | 1.9037 | 31.32 | 0.5947 | −89.828 |
| 4 | 75.4 | 127.188 | 3.17 | 1.0000 | air | | |
| 5 | 75.3 | 269.654 | 4.00 | 1.9409 | 17.40 | 0.6775 | 472.697 |
| 6 | 75.3 | 666.496 | 8.00 | 1.0000 | air | | |

(Numerical Embodiment 3)
Magnification 1.52

| Surface No. | Effective diameter | Curvature radius | d | nd | vd | θgF | Focal length |
|---|---|---|---|---|---|---|---|
| 1 | 116.2 | 152.215 | 16.45 | 1.6204 | 60.29 | 0.5426 | 188.070 |
| 2 | 115.4 | −487.302 | 48.75 | 1.0000 | air | | |
| 3 | 77.8 | −201.758 | 2.20 | 1.9037 | 31.32 | 0.5947 | −92.735 |
| 4 (GNL) | 76.0 | 145.953 | 0.90 | 1.0000 | 22.70 | 0.6891 | 1366.655 |
| 5 | 76.0 | 174.653 | 4.00 | 1.9229 | 18.90 | 0.6495 | 390.727 |
| 6 | 75.7 | 331.161 | 12.00 | 1.0000 | air | | |

(Numerical Embodiment 4)
Magnification 1.33

| Surface No. | Effective diameter | Curvature radius | d | nd | vd | θgF | Focal length |
|---|---|---|---|---|---|---|---|
| 1 | 101.1 | 171.967 | 11.29 | 1.6779 | 55.34 | 0.5472 | 204.100 |
| 2 | 100.3 | −704.609 | 40.60 | 1.0000 | air | | |
| 3 | 75.8 | −293.483 | 6.15 | 1.8900 | 19.15 | 0.6620 | 376.180 |
| 4 | 76.1 | −158.833 | 1.00 | 1.0000 | air | | |
| 5 | 75.4 | −158.370 | 2.10 | 1.9037 | 31.32 | 0.5947 | −110.350 |
| 6 | 76.6 | 276.558 | 10.00 | 1.0000 | air | | |

(Numerical Embodiment 5)

| Surface No. | Effective diameter | Curvature radius | d | nd | vd | θgF | Focal length |
|---|---|---|---|---|---|---|---|
| Magnification 1.50 | | | | | | | |
| 1 | 112.9 | 127.866 | 15.50 | 1.5891 | 61.14 | 0.5406 | 207.878 |
| 2 | 111.7 | −3051.035 | 1.69 | 1.0000 | air | | |
| 3 | 100.5 | 172.364 | 6.02 | 1.4875 | 70.23 | 0.5300 | 670.292 |
| 4 | 98.6 | 359.246 | 36.86 | 1.0000 | air | | |
| 5 | 79.9 | −493.351 | 3.00 | 1.9037 | 31.32 | 0.5947 | −81.468 |
| 6 | 76.4 | 87.554 | 4.53 | 1.9409 | 17.40 | 0.6775 | 318.147 |
| 7 | 75.6 | 119.973 | 13.50 | 1.0000 | air | | |
| (Master Lens) | | | | | | | |
| 1 | 81.8 | −246.922 | 1.80 | 1.7495 | 35.33 | 0.5818 | −158.368 |
| 2 | 80.6 | 232.273 | 6.64 | 1.0000 | air | | |
| 3 | 80.7 | 465.881 | 1.80 | 1.8052 | 25.42 | 0.6161 | −204.738 |
| 4 | 80.2 | 122.384 | 13.88 | 1.6030 | 65.44 | 0.5402 | 116.032 |
| 5 | 80.3 | −157.716 | 7.49 | 1.0000 | air | | |
| 6 | 76.6 | 121.536 | 7.47 | 1.4970 | 81.54 | 0.5374 | 249.876 |
| 7 | 76.0 | 4916.806 | 0.15 | 1.0000 | air | | |
| 8 | 72.0 | 105.098 | 6.38 | 1.6030 | 65.44 | 0.5402 | 220.601 |
| 9 | 71.1 | 482.600 | 0.15 | 1.0000 | air | | |
| 10 | 64.1 | 69.519 | 5.86 | 1.7292 | 54.68 | 0.5444 | 164.550 |
| 11 | 63.0 | 158.452 | (Variable) | 1.0000 | air | | |
| 12 | 28.6 | 228.519* | 0.70 | 1.8830 | 40.76 | 0.5667 | −19.524 |
| 13 | 23.1 | 16.094 | 5.93 | 1.0000 | air | | |
| 14 | 22.8 | −123.222 | 6.59 | 1.8052 | 25.42 | 0.6161 | 20.658 |
| 15 | 22.5 | −15.129 | 0.70 | 1.7550 | 52.32 | 0.5476 | −13.274 |
| 16 | 20.6 | 30.692 | 0.68 | 1.0000 | air | | |
| 17 | 20.7 | 23.413 | 5.61 | 1.6034 | 38.03 | 0.5835 | 25.084 |
| 18 | 20.1 | −39.635 | 0.88 | 1.0000 | air | | |
| 19 | 20.1 | −24.853 | 0.70 | 1.8348 | 42.71 | 0.5642 | −36.411 |
| 20 | 20.1 | 134.691 | (Variable) | 1.0000 | air | | |
| 21 | 21.0 | −28.312 | 0.70 | 1.7432 | 49.34 | 0.5530 | −23.517 |
| 22 | 23.0 | 46.740 | 2.80 | 1.8467 | 23.78 | 0.6205 | 53.738 |
| 23 | 23.6 | −2634.956 | (Variable) | 1.0000 | air | | |
| 24 (Stop) | 27.2 | 0.000 | 1.30 | 1.0000 | air | | |
| 25 | 28.5 | 360.024 | 4.38 | 1.6584 | 50.88 | 0.5561 | 48.297 |
| 26 | 28.9 | −34.891 | 0.15 | 1.0000 | air | | |
| 27 | 29.4 | 93.089 | 2.20 | 1.5163 | 64.14 | 0.5352 | 175.279 |
| 28 | 29.4 | −3728.151 | 0.15 | 1.0000 | air | | |
| 29 | 29.4 | 89.504 | 6.00 | 1.5163 | 64.14 | 0.5352 | 46.348 |

-continued (Numerical Embodiment 5)

| | | | | | | | |
|---|---|---|---|---|---|---|---|
| 30 | 29.2 | −32.080 | 1.80 | 1.8340 | 37.16 | 0.5775 | −45.285 |
| 31 | 29.5 | −210.910 | 35.20 | 1.0000 | air | | |
| 32 | 29.4 | 50.755 | 5.88 | 1.5163 | 64.14 | 0.5352 | 51.234 |
| 33 | 29.2 | −53.480 | 1.67 | 1.0000 | air | | |
| 34 | 28.2 | −77.656 | 1.80 | 1.8348 | 42.71 | 0.5642 | −24.898 |
| 35 | 27.8 | 28.900 | 6.25 | 1.5174 | 52.43 | 0.5564 | 42.686 |
| 36 | 28.1 | −88.443 | 4.17 | 1.0000 | air | | |
| 37 | 28.6 | 86.742 | 6.93 | 1.4875 | 70.23 | 0.5300 | 47.050 |
| 38 | 28.5 | −30.504 | 1.80 | 1.8340 | 37.16 | 0.5775 | −46.521 |
| 39 | 29.2 | −143.178 | 0.18 | 1.0000 | air | | |
| 40 | 29.5 | 52.448 | 4.90 | 1.5182 | 58.90 | 0.5456 | 58.673 |
| 41 | 29.3 | −70.716 | 4.50 | 1.0000 | air | | |
| 42 | 40.0 | 0.000 | 30.00 | 1.6034 | 38.01 | 0.5795 | DG |
| 43 | 40.0 | 0.000 | 16.20 | 1.5163 | 64.15 | 0.5352 | DG |
| 44 | 40.0 | 0.000 | 0.00 | 1.0000 | air | | |

(Extender Portion)

| | | | | | | | |
|---|---|---|---|---|---|---|---|
| 31 | 29.5 | −210.910 | 1.00 | 1.0000 | air | | |
| 32 | 28.2 | 59.255 | 3.13 | 1.5891 | 61.14 | 0.5406 | 79.974 |
| 33 | 28.0 | −229.817 | 0.10 | 1.0000 | air | | |
| 34 | 26.4 | 17.881 | 5.65 | 1.4388 | 94.93 | 0.5343 | 64.109 |
| 35 | 25.1 | 44.155 | 0.10 | 1.0000 | air | | |
| 36 | 22.6 | 15.882 | 5.02 | 1.5163 | 64.14 | 0.5352 | 58.864 |
| 37 | 20.1 | 29.552 | 0.83 | 1.8467 | 23.78 | 0.6205 | −20.406 |
| 38 | 16.7 | 10.830 | 5.36 | 1.0000 | air | | |
| 39 | 16.5 | −84.150 | 0.60 | 1.8830 | 40.76 | 0.5667 | −13.000 |
| 40 | 16.4 | 13.427 | 3.43 | 1.8081 | 22.76 | 0.6307 | 18.909 |
| 41 | 16.4 | 91.277 | 3.00 | 1.0000 | air | | |

Aspherical surface data
Twelfth surface

| | | | |
|---|---|---|---|
| $K = 8.58860e+000$ | $A4 = 7.05382e-006$ | $A6 = -1.80303e-008$ | $A8 = 7.49637e-011$ |
| $A10 = -8.01854e-013$ | $A12 = 5.80206e-015$ | | |
| $A3 = -4.50041e-007$ | $A5 = 1.66019e-008$ | $A7 = -8.87373e-010$ | $A9 = 1.99340e-011$ |
| $A11 = -1.17115e-013$ | | | |

| | Wide angle end | Intermediate | Telephoto end |
|---|---|---|---|
| Focal length | 8.2 | 68.5 | 164.0 |
| F-number | 1.8 | 1.8 | 2.7 |
| d11 | 0.7 | 46.3 | 53.0 |
| d20 | 55.2 | 4.6 | 6.0 |
| d23 | 4.4 | 9.4 | 1.3 |

TABLE 1

| Solid material (1) | |
|---|---|
| d-line refractive index | 1.63560 |
| g-line refractive index | 1.67530 |
| C-line refractive index | 1.62810 |
| F-line refractive index | 1.65600 |

TABLE 1-continued

| Solid material (1) | |
|---|---|
| νd | 22.7 |
| θgF | 0.689 |

TABLE 2

| Number of conditional expression | Conditional Expression | Numerical embodiment | | | | |
|---|---|---|---|---|---|---|
| | | 1 | 2 | 3 | 4 | 5 |
| (1) | $(\theta gF2pa - \theta gF2n)/(\nu d2pa - \nu d2n)$ | −5.95E−03 | −5.95E−03 | −7.09E−03 | −5.53E−03 | −5.95E−03 |
| (2) | $(\theta gF1pa - \theta gF2n)/(\nu d1pa - \nu d2n)$ | −1.81E−03 | −1.91E−03 | −1.80E−03 | −1.98E−03 | −1.73E−03 |
| (3) | $(f2 \times \nu d1t_0)/(f1 \times \nu d2t_0)$ | −1.00 | −0.97 | −1.01 | −1.00 | −1.00 |
| (4) | $\nu d1t_0 - \nu d2n$ | 29.82 | 27.23 | 28.97 | 24.02 | 31.43 |
| (5) | $\nu d2n - \nu d2pa$ | 13.92 | 13.92 | 10.52 | 12.17 | 13.92 |
| (6) | $1.55 < NdG1$ | 1.59 | 1.65 | 1.62 | 1.68 | 1.59 |
| (7) | $1.30 < \beta < 1.60$ | 1.47 | 1.56 | 1.52 | 1.33 | 1.50 |
| (8) | $Dg\_1/L$ | 0.27 | 0.27 | 0.23 | 0.18 | 0.32 |
| (9) | R11/R21 | −0.45 | −0.52 | −0.75 | −0.59 | −0.26 |

TABLE 2-continued

| Number of conditional expression | Conditional Expression | Numerical embodiment | | | | |
|---|---|---|---|---|---|---|
| | | 1 | 2 | 3 | 4 | 5 |
| (10) | \| (R2nr1 − R2nr2)/(R2nr1 + R2nr2) \| | 0.33 | 0.29 | 0.16 | 0.27 | 0.70 |
| (11) | $0.04 < \Delta\theta gF\_pave < 0.08$ | 0.06 | 0.06 | 0.06 | 0.06 | 0.05 |
| (12) | $1.20 < L/e' < 1.40$ | 1.32 | 1.27 | 1.30 | 1.24 | 1.37 |
| (13) | $2 < fGNL/f2p < 5$ | — | — | 3.50 | — | — |
| (14) | $-2.100 \times 10^{-3} \times \nu d2pp$ $\theta gF2pp$ | — | — | −0.05 0.69 | — | — |
| (15) | $\nu d2pp$ | — | — | 22.70 | — | — |
| (16) | $\Delta sk$ | 1.09 | 1.10 | 1.09 | 1.04 | 0.92 |
| (1a) | $\{(\theta gF2pa − \theta gF2n)/(\nu d2pa − \nu d2n)\}/\beta$ | −4.05E−03 | −3.81E−03 | −4.67E−03 | −4.16E−03 | −3.97E−03 |
| (2a) | $\{(\theta gF1pa − \theta gF2n)/(\nu d1pa − \nu d2n)\}/\beta$ | −1.23E−03 | −1.23E−03 | −1.18E−03 | −1.49E−03 | −1.15E−03 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-026210, filed Feb. 9, 2012, which is hereby incorporated by reference herein in its entirety.

What is claimed is:

1. A tele-side converter lens, to be removably mounted to an object side of a master lens so as to increase a focal length of an entire system, the tele-side converter lens comprising, in order from the object side to an image side, a first lens unit having a positive refractive power and a second lens unit having a negative refractive power, the first lens unit and the second lens unit being formed with a largest air interval therebetween, wherein:

the first lens unit includes one or two positive lenses;
the second lens unit includes one negative lens and one or two positive lenses; and
the following conditional expressions are satisfied:

$-12.50 \times 10^{-3} < (\theta gF2pa - \theta gF2n)/(\nu d2pa - \nu d2n) < -5.50 \times 10^{-3}$;

$-2.05 \times 10^{-3} < (\theta gF1pa - \theta gF2n)/(\nu d1pa - \nu d2n) < -1.65 \times 10^{-3}$;

$-1.05 < (f2 \times \nu d1t0)/(f1 \times \nu d2t0) < -0.95$;

$22.0 < \nu d1t0 - \nu d2n < 32.0$;

$10.0 < \nu d2n - \nu d2pa < 14.5$;

$1.55 < NdG1$; and $1.30 < \beta < 1.60$, where
$\nu d1pa$ and $\theta gF1pa$ respectively represent an average Abbe constant and an average partial dispersion ratio of materials of positive lenses constituting the first lens unit,
$\nu d2pa$ and $\theta gF2pa$ respectively represent an average Abbe constant and an average partial dispersion ratio of materials of positive lenses constituting the second lens unit,
$\nu d2n$ and $\theta gF2n$ respectively represent an Abbe constant and a partial dispersion ratio of materials of the negative lenses constituting the second lens unit,
$\nu d1t0$ represents a combined Abbe constant of materials of the lenses constituting the first lens unit,
$\nu d2t0$ represents a combined Abbe constant of materials of the lenses constituting the second lens unit,
f1 and f2 represent focal lengths of the first lens unit and the second lens unit, respectively,
NdG1 represents a refractive index of a material of a positive lens disposed closest to the object side, and
$\beta$ represents a magnification of the tele-side converter lens, provided that a combined Abbe constant $\nu di$ of an i-th lens unit is expressed by the following equation:

$$\nu di = (1/fi) \bigg/ \sum_{k=1}^{m} \{1/(fik \times \nu ik)\}$$

where m represents a number of lenses constituting the i-th lens unit, and fik and $\nu ik$ respectively represent a focal length and an Abbe constant of a k-th lens from the object side in the i-th lens unit.

2. A tele-side converter lens according to claim 1, wherein:
the second lens unit includes two positive lenses; and
the following conditional expressions are satisfied:

$-2.100 \times 10^{-3} \times \nu d2pp + 0.693 < \theta gF2pp$; and $\nu d2pp < 30$, where $\nu d2pp$ and $\theta gF2pp$ respectively represent an Abbe constant and a partial dispersion ratio of a material of one of the two positive lenses.

3. A tele-side converter lens according to claim 1, wherein:
the second lens unit includes two positive lenses; and
the following conditional expression is satisfied:

$2 < fGNL/f2p < 5$, where fGNL represents a focal length of one of the two positive lenses having a longer focal length, and f2p represents a focal length of the other of the two positive lenses.

4. A tele-side converter lens according to claim 1, wherein the following conditional expression is satisfied:

$0.10 < Dg\_1/L < 0.35$, where L represents a total lens thickness of the tele-side converter lens, and Dg_1 represents a total lens thickness of the first lens unit.

5. A tele-side converter lens according to claim 1, wherein the following conditional expression is satisfied:

$-0.85 < R11/R21 < -0.20$, where R11 represents a curvature radius of a lens surface closest to the object side in the first lens unit, and R21 represents a curvature radius of a lens surface closest to the object side in the second lens unit.

6. A tele-side converter lens according to claim 1, wherein the following conditional expression is satisfied:

$$0.10 < |(R2nr1-R2nr2)/(R2nr1+R2nr2)| < 0.80,$$

where R2$nr1$ represents a curvature radius of a lens surface on the object side of the negative lens of the second lens unit, and R2$nr2$ represents a curvature radius of a lens surface on the image side of the negative lens of the second lens unit.

7. A tele-side converter lens according to claim 1, wherein:
the second lens unit includes two positive lenses; and
when an Abbe constant of a material of the two positive lenses is represented by vd, a partial dispersion ratio of the material of the two positive lenses is represented by θgF, and a deviation amount ΔθgF from a standard line of the partial dispersion ratio θgF is expressed by the following equation:

$$\Delta\theta gF = \theta gF - (-0.00168 \times vd + 0.6438),$$

the following conditional expression is satisfied:

$$0.04 < \Delta\theta gF\_pave < 0.08,$$

where ΔθgF_pave represents an average value of a deviation amount from the standard line of the partial dispersion ratio of the material of the two positive lenses.

8. A tele-side converter lens according to claim 1, wherein the following conditional expression is satisfied:

$$1.20 < L/e' < 1.40,$$

where L represents a total lens thickness of the tele-side converter lens, and e' represents a principal point interval between the first lens unit and the second lens unit.

9. An image pickup apparatus comprising:
a master lens;
a tele-side converter lens, to be mountable to an object side of the master lens so as to increase a focal length of an entire system, the tele-side converter lens comprising, in order from the object side to an image side, a first lens unit having a positive refractive power and a second lens unit having a negative refractive power, the first lens unit and the second lens unit being formed with a largest air interval therebetween, wherein;
the first lens unit includes one or two positive lenses;
the second lens unit includes one negative lens and one or two positive lenses; and
the following conditional expressions are satisfied:

$$-12.50 \times 10^{-3} < (\theta gF2pa - \theta gF2n)/(vd2pa - vd2n) < -5.50 \times 10^{-3};$$

$$-2.05 \times 10^{-3} < (\theta gF1pa - \theta gF2n)/(vd1pa - vd2n) < -1.65 \times 10^{-3};$$

$$-1.05 < (f2 \times vd1t0)/(f1 \times vd2t0) < -0.95;$$

$$22.0 < vd1t0 - vd2n < 32.0;$$

$$10.0 < vd2n - vd2pa < 14.5;$$

$$1.55 < NdG1; \text{ and}$$

$$1.30 < \beta < 1.60,$$

where
vd1$pa$ and θgF1$pa$ respectively represent an average Abbe constant and an average partial dispersion ratio of materials of positive lenses constituting the first lens unit,
vd2$pa$ and θgF2$pa$ respectively represent an average Abbe constant and an average partial dispersion ratio of materials of positive lenses constituting the second lens unit,
vd2$n$ and θgF2$n$ respectively represent an Abbe constant and a partial dispersion ratio of materials of the negative lenses constituting the second lens unit,
vd1$t0$ represents a combined Abbe constant of materials of the lenses constituting the first lens unit,
vd2$t0$ represents a combined Abbe constant of materials of the lenses constituting the second lens unit,
f1 and f2 represent focal lengths of the first lens unit and the second lens unit, respectively,
NdG1 represents a refractive index of a material of a positive lens disposed closest to the object side, and
β represents a magnification of the tele-side converter lens,
provided that a combined Abbe constant vdi of an i-th lens unit is expressed by the following equation:

$$vdi = (1/fi) \bigg/ \sum_{k=1}^{m} \{1/(fik \times vik)\}$$

where m represents a number of lenses constituting the i-th lens unit, and fik and vik respectively represent a focal length and an Abbe constant of a k-th lens from the object side in the i-th lens unit; and
a solid-state image pickup element which receives an image formed by the tele-side converter lens and the master lens.

* * * * *